(12) United States Patent
Takehisa

(10) Patent No.: US 9,085,216 B2
(45) Date of Patent: Jul. 21, 2015

(54) ON-VEHICLE CONTROL SYSTEM EQUIPPED WITH ACTUATOR DRIVEN BASED ON TARGET VALUE

(75) Inventor: Satoshi Takehisa, Nagoya (JP)

(73) Assignee: DENSO CORPORATION, Kariya (JP)

( * ) Notice: Subject to any disclaimer, the term of this patent is extended or adjusted under 35 U.S.C. 154(b) by 127 days.

(21) Appl. No.: 13/334,642

(22) Filed: Dec. 22, 2011

(65) Prior Publication Data

US 2012/0166041 A1 Jun. 28, 2012

(30) Foreign Application Priority Data

Dec. 27, 2010 (JP) ................................ 2010-290599

(51) Int. Cl.
*B60K 31/04* (2006.01)
*B60H 1/00* (2006.01)

(52) U.S. Cl.
CPC ........ *B60H 1/00785* (2013.01); *B60H 1/00742* (2013.01); *B60H 1/00764* (2013.01); *B60H 2001/00992* (2013.01)

(58) Field of Classification Search
CPC ............ F02D 41/0007; B60H 1/00785; B60H 2001/00992
USPC .............. 701/36, 110, 41, 51, 53, 79; 60/602, 60/599; 123/334, 352, 339.14, 339.17, 123/339.18, 339.22, 339.24; 180/179, 338, 180/339
See application file for complete search history.

(56) References Cited

U.S. PATENT DOCUMENTS

| 5,351,776 A | 10/1994 | Keller et al. |
| 7,084,774 B2 * | 8/2006 | Martinez ........................ 340/584 |
| 8,171,264 B2 | 5/2012 | Miyamoto |
| 2005/0027402 A1 | 2/2005 | Koibuchi et al. |
| 2006/0259219 A1 * | 11/2006 | Wakiyama et al. ............. 701/36 |
| 2007/0150116 A1 | 6/2007 | Schwartz et al. |
| 2007/0150118 A1 | 6/2007 | Takamatsu et al. |
| 2007/0169007 A1 | 7/2007 | Hashimoto et al. |
| 2007/0225873 A1 | 9/2007 | Toya et al. |
| 2008/0229082 A1 | 9/2008 | Miyamoto |

(Continued)

FOREIGN PATENT DOCUMENTS

| JP | H05-085228 | 4/1993 |
| JP | 3036183 | 2/2000 |

(Continued)

OTHER PUBLICATIONS

Office action dated May 7, 2014 in corresponding Japanese Application 2010-290599.

*Primary Examiner* — Dalena Tran
(74) *Attorney, Agent, or Firm* — Harness, Dickey & Pierce, PLC

(57) ABSTRACT

In a control system mounted in a vehicle, information indicative of a user's desire depending on the signal from at least one of a sensor and user's input device is outputted. A target value of a first state quantity for travel of the vehicle is outputted. The target value is for realizing control of in-vehicle environment in accordance with the user's desire. A command value for controlling an actuator is outputted, where the command value is for realizing the target value. The actuator is controlled based on the command value. A controllable range for the first state quantity is specified depending on a capability of the actuator, and the specified controllable range is outputted for outputting the target value. The target value is calculated such that the target value falls into the controllable range.

8 Claims, 10 Drawing Sheets

(56) References Cited

U.S. PATENT DOCUMENTS

| | | | |
|---|---|---|---|
| 2009/0138155 A1* | 5/2009 | Wakiyama et al. | 701/36 |
| 2010/0235046 A1* | 9/2010 | Proefke et al. | 701/36 |
| 2011/0307131 A1* | 12/2011 | Norden | 701/22 |

FOREIGN PATENT DOCUMENTS

| | | |
|---|---|---|
| JP | 2003-267024 | 9/2003 |
| JP | 2005-178628 | 7/2005 |
| JP | 2005-267039 | 9/2005 |
| JP | 2007-512991 | 5/2007 |
| JP | 3956693 | 5/2007 |
| JP | 2007-253792 | 10/2007 |
| JP | 4059194 | 12/2007 |
| JP | 2008-221991 | 9/2008 |
| JP | 2009-113506 | 5/2009 |
| JP | 2009-137582 | 6/2009 |
| JP | 2009-143354 | 7/2009 |

\* cited by examiner

| DISCOMFORT INDEX | PERCEPTION |
|---|---|
| ~ 55 | VERY COLD |
| 55 ~ 60 | QUITE COLD |
| 60 ~ 65 | COOL |
| 65 ~ 70 | COMFORTABLE |
| 70 ~ 75 | WARM |
| 75 ~ 80 | QUITE HOT |
| 80 ~ 85 | HOT |
| 85 ~ | VERY HOT |

ON-VEHICLE CONTROL SYSTEM EQUIPPED WITH ACTUATOR DRIVEN BASED ON TARGET VALUE

CROSS-REFERENCE TO RELATED APPLICATION

This application is based on and claims the benefit of priority from earlier Japanese Patent Application No. 2010-290599 filed Dec. 27, 2010, the description of which is incorporated herein by reference.

BACKGROUND

1. Technical Field

The present invention relates to an on-vehicle control system, and in particular, to an on-vehicle control system equipped with an actuator driven based on a target value.

2. Related Art

An electronic device for a vehicle disclosed in a patent document JP-A-H05-085228, for example, includes various elements to realize a driver's desire in the vehicle. Practically, a first element outputs the driver's desire (or driver's intention) according to the driver's manipulation of the accelerator pedal or the brake pedal (manipulated variable of the accelerator pedal or the brake pedal). A second element outputs a target value of the state quantity of the vehicle (e.g. target acceleration) in conformity with the driver' desire. A third element outputs a control value for each of actuators (engine and transmission) in conformity with the outputted target value of the state quantity. Fourth and fifth elements control the actuators according to the outputted control values.

In the technique disclosed in the above patent document, the second element only determines and outputs a target value (e.g., target acceleration) of the state quantity of the vehicle to realize the user's desire. Accordingly, the second element can be designed irrespective of the configuration or the ability of each actuator installed in the vehicle. In this case, the second element can be commonly used irrespective of the type of the vehicle it is installed in. On the other hand, regarding the third to fifth elements, different models may be used depending on the type of the vehicle these elements are installed in.

With this configuration, however, the target value outputted by the second element may not necessarily be realized by the actuators, depending on the configuration and the ability of each actuator.

SUMMARY

Under the condition as set forth above, it is thus desired, in an on-vehicle control system having an element that outputs a target value of a state quantity of the vehicle to realize the user's desire (i.e., user's intention) and an element that outputs a control value for each actuator to realize the target value, to reduce the probability that the element for outputting a target value should output a target value that cannot be realized by each actuator.

An exemplary embodiment provides a control system mounted in a vehicle equipped with at least one of a sensor and a user's input device and a first actuator controlled based on a signal from at least one of the sensor and user's input device, first output means for outputting information indicative of a user's desire (user's intention) depending on the signal from at least one of the sensor and user's input device; second output means for outputting a target value of a first state quantity for travel of the vehicle, the target value of the first state quantity being for realizing control of in-vehicle environment in accordance with the information from the first output means: third output means for outputting a command value for controlling the first actuator, the command value being for realizing the target value of the first state quantity outputted from the second output means; and first control means for controlling the first actuator based on the command value outputted from the third output means. The third output means is configured to specify a controllable range for the first state quantity depending on a capability of the first actuator, and output the specified controllable range to the second output means, and the second output means is configured to calculate the target value of the first state quantity such that the target value falls into the controllable range outputted from the third output means.

Thus, the third output means defines the controllable range of a state quantity of the vehicle, which is suitable for the ability of the actuator and outputs the defined controllable range to the second output means. Then, the second output means calculates a target value of the state quantity so as to fall within the controllable range of the state quantity. Therefore, the probability for the second output means to output target values that cannot be realized by the actuator is reduced. Such unrealizable target values would otherwise have been outputted to the third output means, due to the silence of the third output means about the specific structural varieties of the actuator.

It is preferred that the control system includes a first ECU (electronic control unit) and a second ECU communicable with the first ECU, wherein the first ECU functionally includes the first output means, and the second ECU functionally includes the second and third output means and the first control means.

This configuration facilitates the change of a sensor or a control input device for indicating a user's desire. Various devices can be appropriately used as the sensor or the control input device for transmitting a user's desire. For example, such devices include a control panel provided with specific switch buttons, a touch panel having a display on which switch buttons are shown for touch input, a distance control device operated by combining switches mounted to a steering with a display in a distance, a voice recognition device, a vehicle interior temperature sensor, and a vehicle interior humidity sensor.

Thus, the first output means may be installed in the first ECU to output the information indicating a user's desire in response to the signal outputted from the sensor or the control input device. Also, the second output means, third output means and the first control means may be installed in the second ECU. Thus, change of the sensor or the control input device involves only the change of the first ECU, without requiring the need of changing the second ECU. This configuration is advantageous when a variety of models of sensors or control input devices are desired to be prepared for a plurality of vehicles.

Another exemplary embodiment provides a control system mounted in a vehicle equipped with at least one of a sensor and a user's input device and a first actuator and a second actuator both controlled based on a signal from at least one of the sensor and user's input device, first output means for outputting information indicative of a user's desire depending on the signal from at least one of the sensor and user's input device; second output means for outputting both a target value of a first state quantity and a target value of a second quantity for travel of the vehicle, the target values of the first and second state quantities being for realizing control of in-vehicle environment in accordance with the information from the first output means: third output means for outputting a command value for controlling the first actuator, the command value for controlling the first actuator being for realizing the target value of the first state quantity outputted from the second output means; fourth output means for outputting a command value for controlling the second actuator, the command value for controlling the second actuator being for realizing the target value of the second state quantity outputted from the second output means; first control means for controlling the first actuator based on the command value outputted from the third output means; and second control means for controlling the second actuator based on the command value outputted from the fourth output means. The third output means is configured to specify a controllable range for the first state quantity depending on a capability of the first actuator, and output the specified controllable range to the second output means, the fourth output means is configured to specify a controllable range for the second state quantity depending on a capability of the second actuator, and output the specified controllable range to the second output means, and the second output means includes means for calculating both an interim target value for the first state quantity and an interim target value for the second state quantity within a range for realizing the control of the in-vehicle environment in accordance with the information from the first output means, means for determining whether or not both the interim target values for the first and second state quantities meet a condition that the interim target value for the first state quantity is outside the controllable range of the first state quantity outputted from the third output means and the interim target value for the second state quantity is within the controllable range of the second state quantity outputted from the fourth output means, means for correcting the interim target value for the first state quantity falls in the controllable range of the first state quantity and the interim target value for the second state quantity is still within the controllable range of the second state quantity when it is determined that the condition is met, and means for outputting, as the target values for the first and second state quantities, the corrected interim target values for the first and second state quantities.

Thus, of the interim target values of the first and second state quantities, if the interim target value of the first state quantity fails to fall within the controllable range, the interim target values of both of the first and second state quantities are corrected. Therefore, vehicle interior conditions can be more quickly and efficiently controlled along the lines of the user's desire. Such control is enabled by the feedback of the controllable ranges to the second output means. Thus, the second output means is able to output different target values of state quantities to each of the plurality of third output means.

It is preferred that the control system includes a first ECU (electronic control unit) and a second ECU communicable with the first ECU, wherein the first ECU functionally includes the second and fourth output means and the second control means, and the second ECU functionally includes the first and third output means and the first control means.

With this configuration, when the calculation process is ensured to be changeable in determining a target value of a state quantity reflecting the user's desire, the change can be readily made. For example, let us discuss the case where two types of second output means are available. One second output means uses a temperature-humidity index (or a discomfort index) to convert a user's desire into a target value of state quantity. The other second output means uses a perceived temperature to convert a user's desire into a target value of state quantity. In this case, the second output means can be cut out and installed in an ECU (the first ECU) which is separate from the first output means, the third output means and the first control means. Accordingly, the change of the control, i.e. the calculation process in determining a target value of a state quantity reflecting the user's desire, can be readily realized without requiring the change of the second ECU.

Of the two types of second output means, one may use the fourth output means and the second control means, while the other may not use these means. In this case, the former second output means may be arranged in an ECU (the first ECU) together with the fourth output means and the second control means. The latter second output means may be solely arranged an ECU (the first ECU). Thus, the second ECU can be commonly used for all types of vehicle. The change in the former or in the latter may be made as appropriate by changing the first ECU. Such a configuration is convenient, for example, for different grade cars, such as standard cars and luxury cars, which commonly install the second ECU.

It is still preferred that the control system includes a first ECU (electronic control unit) and a second ECU communicable with the first ECU, wherein the first ECU functionally includes the fourth output means and the second control means, and the second ECU functionally includes the first, second and third output means and the first control means.

This configuration can facilitate development of the system when a plurality of models of actuators are available to the system. Let us take as an example the case where two configurations are prepared for the second actuator (e.g., one configuration may include only a front air condition and the other configuration may include both of front and rear air conditioners). In this case, the fourth output means as well as the second control means one order lower than the fourth output means are cut out and installed in an ECU, or the first ECU, separately from the first output means, the second output means, the third output means and the first control means. Thus, whichever configuration is applied, the configuration is usable by changing only the first ECU as required. Thus, an ECU, or the second ECU, including the calculation section (the second output means) of a second state quantity can be commonly used.

In other words, the means involved in a variety of actuators can be collectively arranged in the first ECU, while the otherwise means can be collectively arranged in the second ECU. Thus, the second ECU can be commonly used in all types of vehicles, while the first ECU can be developed in conformity with the equipment (actuators) to be used in the system.

For example, a vehicle of a type may have different equipment depending on the grade or specification (whether or not the vehicle is based on a cold area specification). In such a case, the two configurations as set forth above are advantageous.

In the foregoing various embodiments, as a modification, the first actuator is an air conditioner that controls temperature in an interior of the vehicle, the second actuator is a dehumidifier that dehumidifies air in the interior of the vehicle, the first state quantity is the temperature in the interior of the vehicle, and the second state quantity is humidity in the interior of the vehicle.

DETAILED DESCRIPTION OF THE PREFERRED EMBODIMENTS

With reference to the accompanying drawings, hereinafter are described several embodiments of the disclosure.

(First Embodiment)

Figure 1:
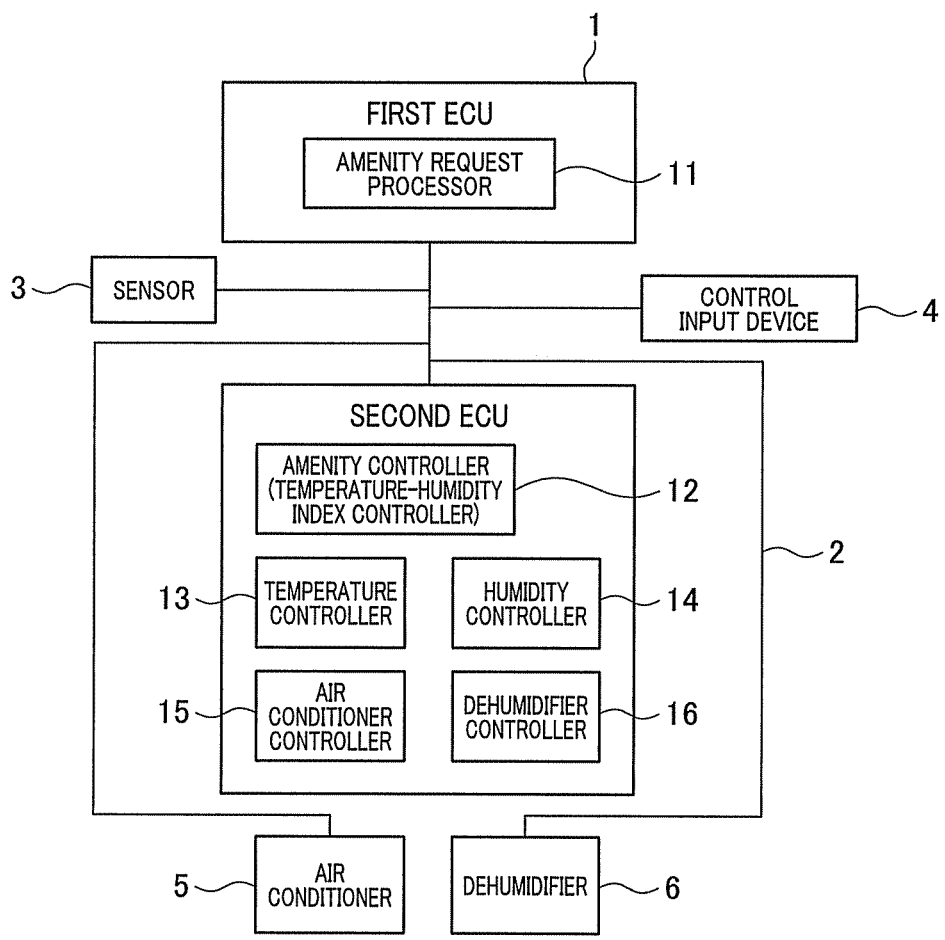
FIG. 1 is a schematic diagram illustrating a configuration of an on-vehicle control system according to a first embodiment of the disclosure.

Referring first to FIGS. 1 to 5, first, a first embodiment of the disclosure is described. FIG. 1 is a schematic diagram illustrating a configuration of an on-vehicle control system according to the first embodiment. The on-vehicle control system (hereinafter also just referred to as "the control system" or "the system") is installed in a vehicle and includes a first ECU 1 and a second ECU 2. The first and second ECUs 1 and 2 are able to communicate with each other via a communication line (e.g., on-vehicle LAN). The first and second ECUs 1 and 2 are able to acquire signals outputted from a sensor 3 and a control input device 4 via the communication line (or a signal line connected on a one-to-one basis). Further, the first and second ECUs 1 and 2 are able to control actuators 5 and 6 (air conditioner 5 and dehumidifier 6) via the communication line (or a signal line connected on a one-to-one basis).

The sensor 3 includes an interior temperature sensor that detects and outputs a temperature in the vehicle interior, an interior humidity sensor that detects and outputs humidity in the vehicle interior, or an outside temperature sensor that detects and outputs an outside temperature that is a temperature around the vehicle.

The control input device 4 is operated by a user, i.e. a vehicle occupant. The control input device 4 outputs a signal in response to the operation. Specifically, the control input device 4 includes a plurality of buttons mounted to the dashboard of the vehicle. These buttons are used for inputting one of user's desired perceptions of coldness/hotness, such as "very cold", "quite cold", "cool", "comfortable", "warm", "quite hot", "hot" and "very hot".

The air conditioner 5 is a well-known device for controlling temperature in the vehicle interior. The dehumidifier 6 is also a well-known device for controlling humidity in the vehicle interior.

With the configuration as described above, the on-vehicle control system including the first and second ECUs 1 and 2 controls the air conditioner 5 and the dehumidifier 6 based on a signal outputted from the sensor 3 and the control input device 4.

Hereinafter, the first and second ECUs 1 and 2 are described. The first and second ECUs 1 and 2 each include a control circuit (e.g., known microcomputer), a communication interface and a flash memory (or a different non-volatile storage medium). The communication interface is a well-known interface circuit that transmits/receives signals to/from the sensor 3, the control input device 4, the actuators 5 and 6, and a destination ECU (the second ECU 2 is the destination ECU for the first ECU 1, and the first ECU 1 is the destination ECU for the second ECU 2) via the communication line or the like.

The first ECU 1 has a control circuit that functions as an amenity request processor 11 by executing a predetermined program stored in a ROM of the control circuit. In other words, the first ECU 1 is provided with the amenity request processor 11.

The second ECU 2 has a control circuit that parallelly executes predetermined programs stored in a ROM of the control circuit. Specifically, the control circuit executes in parallel an amenity control program, an interior temperature control program, an interior humidity controller program, an air conditioner controller program and a dehumidifier controller program to function as an amenity controller 12, an interior temperature controller 13 (hereinafter also just referred to as "temperature controller 13"), an interior humidity controller 14 (hereinafter also just referred to as "humidity controller 14"), an air conditioner controller 15 and a dehumidifier controller 16, respectively. In other words, the second ECU 2 is provided with the temperature controller 13, the humidity controller 14, the air conditioner controller 15 and the dehumidifier controller 16.

Figures 2, 3:
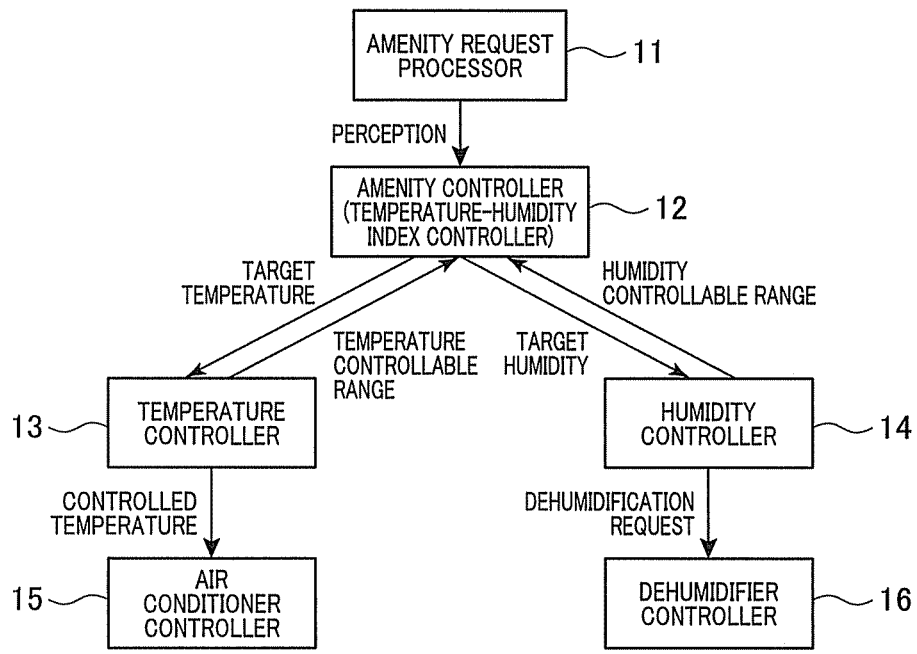
FIG. 2 is a schematic diagram illustrating a hierarchical structure of functional units in the system.
FIG. 3 is a table correlating user's desired perception and temperature-humidity index that would meet the user's desire.

FIG. 2 is a schematic diagram illustrating a functional hierarchical structure of the amenity request processor 11, amenity controller 12, temperature controller 13, humidity controller 14, air conditioner controller 15 and dehumidifier controller 16. Referring to FIG. 2, hereinafter are described processes performed in these functional units 11 to 16.

The amenity request processor 11 (corresponding to an example of the user's desire outputting means (the first output means)) outputs a signal reflecting the user's desire, in response to the signals outputted from the sensor 3 and the control input device 4.

For example, when a user in the vehicle wishes to feel quite cold in the vehicle interior, the user should operate the "quite cold" button among the buttons of the control input device 4. In this case, the control input device 4 outputs a signal to the first ECU 1 to indicate the operation of the "quite cold" button. The amenity request processor 11 of the first ECU 1 receives this signal and outputs, to the amenity controller 12, a target temperature-humidity index range as a user's desire (or user's intention) indicated by the signal.

Specifically, the flash memory (or ROM of the control circuit) of the first ECU 1 stores data that in the form of a table, as shown in FIG. 3, correlating user's desired perceptions (e.g., desire of feeling "quite cold in the vehicle interior") with temperature-humidity index ranges that would match the respective user's desired perceptions. The amenity request processor 11 acquires the signal outputted from the control input device 4 and identifies a temperature-humidity index range corresponding to the desired perception indicated by the acquired signal (temperature-humidity index range that would match the user's desire). For example, the amenity request processor 11 identifies a range of "55 to 60" as the temperature-humidity index range corresponding to "quite cold" and outputs the identified range as a target temperature-humidity index range.

Alternatively, in addition to the signal received from the control input device 4, the amenity request processor 11 may acquire signals outputted from the interior temperature sensor and the interior humidity sensor as the sensor 3. Then, the amenity request processor 11 may calculate the current vehicle interior temperature and humidity based on the signals acquired from these sensors. After that, the amenity request processor 11 may correct the user's perception (e.g., "quite cold") indicated by the signal received from the control input device 4, based on the calculated interior temperature and humidity.

Alternatively, the amenity request processor 11 may acquire signals outputted from the interior temperature sensor and the interior humidity sensor as the sensor 3. Then, the amenity request processor 11 may calculate (estimate) a temperature-humidity index range of the user's desired perception regarding coldness/hotness in the vehicle interior, only based on the signals acquired from these sensors without using the table of correlation.

The amenity controller 12 (corresponding to an example of the desire-state converting means (the second output means)) controls the vehicle interior conditions so as to be suitable for the target temperature-humidity index range outputted from the amenity request processor 11. To this end, the amenity controller 12 calculates a target value of a vehicle interior humidity (target humidity) (corresponding to an example of the first state quantity) and a target value of a vehicle interior temperature (target temperature) (corresponding to an example of the second state quantity). Then, the amenity controller 12 outputs the calculated target temperature to the temperature controller 13 and outputs the calculated target humidity to the humidity controller 14. In this case, the output of the target temperature and the target humidity is realized by writing these target values in the RAM of the control circuit. The details of the process performed by the amenity controller 12 will be described later.

The temperature controller 13 (corresponding to an example of the second state-equipment converting means (the fourth output means)) periodically reads and acquires a target temperature (corresponding to an example of a target value of the second state quantity) stored in the RAM. The temperature controller 13 then outputs a control value for the air conditioner 5 to realize the acquired target temperature.

Specifically, the temperature controller 13 defines the current interior temperature based on a signal outputted from the interior temperature sensor as the sensor 3. Then, the temperature controller 13 compares the current interior temperature with the read target temperature.

Then, in cooling (i.e. when the target temperature is lower than the current interior temperature), the temperature controller 13 sets the control value to a temperature (i.e. controlled temperature) lower by a predetermined value than the target temperature (this value is referred to as "offset temperature"). The offset temperature is made larger as the absolute value of the difference between the target temperature and the current interior temperature becomes larger, so that the interior temperature more quickly reaches the target temperature.

Similarly, in heating (i.e. when the target temperature is higher than the interior temperature), the temperature controller 13 sets the control value to a value (i.e. controlled temperature) which is higher than the target temperature by a predetermined offset temperature. The offset temperature is made larger as the absolute value of the difference between the target temperature and the current interior temperature becomes larger, so that the interior temperature more quickly reaches the target temperature.

The controlled temperature calculated (set) as a control value by the temperature controller 13 is outputted to the air conditioner controller 15. In this case, the output of the controlled temperature is realized by writing the controlled temperature into the RAM of the control circuit. Alternative to the control based on the current interior temperature as described above, a controlled temperature equal to the target temperature may be outputted to the air conditioner controller 15.

The air conditioner controller 15 (corresponding to an example of the second equipment control means (the second control means)) periodically (e.g., once in a second) reads and acquires a controlled temperature (control value) for the air conditioner 5 outputted by (written into the RAM by) the temperature controller 13. Then, the air conditioner controller 15 controls the air conditioner 5 using various known methods to realize the acquired controlled temperature.

The humidity controller 14 (corresponding to an example of the first state-equipment converting means (the third output means)) periodically (e.g., once in a second) reads and acquires the target humidity (corresponding to an example of the target value of the first state quantity) stored in the RAM. The humidity controller 14 then outputs a control value for the dehumidifier 6 to realize the acquired target humidity.

Specifically, the humidity controller 14 defines the current interior humidity based on a signal outputted from the interior humidity sensor as the sensor 3. The humidity controller 14 then compares the current interior humidity with the target humidity. If the target humidity is lower than the current interior humidity, the humidity controller 14 outputs a control value (dehumidification request) to the dehumidifier controller 16 to activate the dehumidifier 6. If the target humidity is not less than the interior humidity, the humidity controller 14 outputs a control value to the dehumidifier controller 16 to stop the dehumidifier 6. In this case, the output of a control value is realized by writing the control value into the RAM of the control circuit.

The dehumidifier controller 16 (corresponding to an example of the first equipment control means (the first control means)) periodically (e.g., once in a second) reads and acquires a control value for the dehumidifier 6 outputted from (written into the RAM by) the humidity controller 14. Then, the dehumidifier controller 16 controls the dehumidifier 6 according to the acquired control value.

Specifically, if a control value indicating activation of the dehumidifier 6 is acquired when the dehumidifier 6 is in an activated sate, the activation of the dehumidifier 6 is continued as it is. If a control value indicating stopping of the dehumidifier 6 is acquired when the dehumidifier 6 is in an activated sate, the activation of the dehumidifier 6 is stopped. Also, if a control value indicating activation of the dehumidifier 6 is acquired when the dehumidifier 6 is in a stopped state, the activation of the dehumidifier 6 is started. If a control value indicating stopping of the dehumidifier 6 is acquired when the dehumidifier 6 is in a stopped state, the dehumidifier 6 is permitted to stay in the stopped state.

As described above, a hierarchical structure is constituted by the amenity request processor 11, amenity controller 12, temperature controller 13, humidity controller 14, air conditioner controller 15 and dehumidifier controller 16. Specifically, the amenity request processor 11 at the top outputs a user's desire to the amenity controller 12 one level lower in the hierarchy than the amenity request processor 11. The amenity controller 12 outputs a target temperature and a target humidity to the temperature controller 13 and the humidity controller 14 one order lower than the amenity controller 12. Then, the temperature controller 13 outputs a controlled temperature to the air conditioner controller 15 one order lower than the temperature controller 13. The humidity controller 14 outputs a control value to the dehumidifier controller 16 one order lower than the humidity controller 14.

Hereinafter is described a process of feeding back a temperature controllable range from the temperature controller 13 to the amenity controller 12 in the hierarchical structure.

In the feedback process performed parallel to the operation described above, the temperature controller 13 repeatedly and periodically (e.g., once in a second) defines a controllable range of a vehicle interior temperature (corresponding to an example of the second state quantity) suitable for the ability of the air conditioner 5. Then, the temperature controller 13 outputs the defined controllable range (i.e. temperature controllable range) of the vehicle interior temperature to the amenity controller 12.

Figure 4:
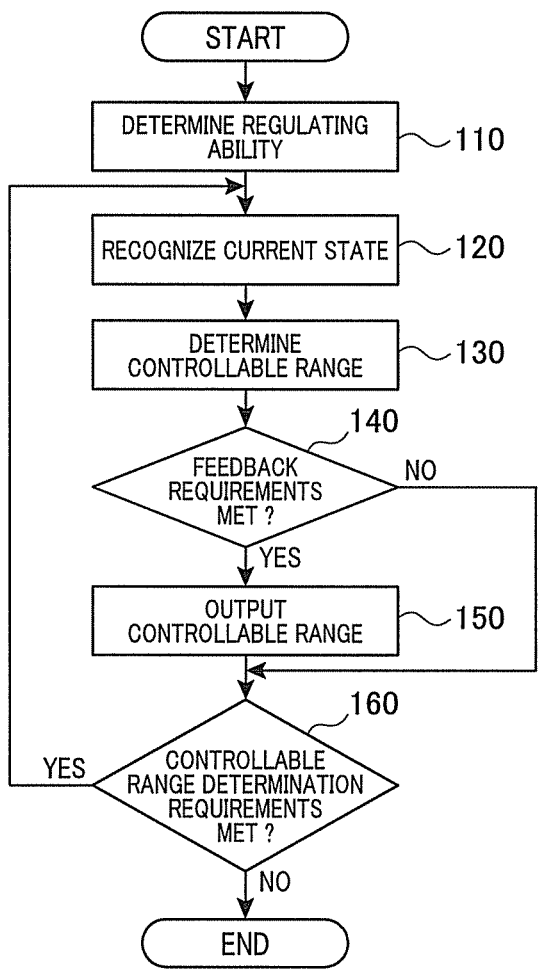
FIG. 4 is a flow diagram illustrating a feedback process performed by a temperature controller and a humidity controller in the system.

The temperature controller 13 performs a feedback process as illustrated in the flow diagram of FIG. 4. The temperature controller 13 is ensured to start the feedback process with the start of the second ECU 2. As shown in FIG. 4, at step 110, first, a regulating ability is determined as an initialization. Specifically, connected-device information and ability information are acquired. The connected-device information indicates the model name of an actuator for interior temperature control connected to the communication line. The ability information indicates the level of cooling/heating ability of the connected actuator (air conditioner 5).

Specifically, the connected-device information and the ability information may be stored in advance in the flash memory of the second ECU 2 (or ROM of the control circuit) and read out. In this case, when the model of the air conditioner 5 installed in the vehicle is determined, connected-device information and ability information suitable for the model of the air conditioner 5 are stored in the flash memory (or ROM of the control circuit). The connected-device information to be stored in this case includes the model name of the air conditioner 5.

The ability information to be stored in this case includes the cooling/heating ability information of the air conditioner 5 of the model depending on outside temperature (temperature around the vehicle). For example, the ability information includes an interior temperature range that can be realized by the air conditioner 5 (temperature controllable range) for each of 5° C. increments within an outside temperature range of −20° C. to 50° C.

Alternative to the above, the connected-device information and the ability information of the air conditioner 5 may be included in advance in programs for realizing the temperature controller 13 and the air conditioner controller 15. In this case, the programs for realizing the temperature controller 13 and the air conditioner controller 15 may be prepared for every model of the air conditioner 5. When a model of the air conditioner 5 to be installed in the vehicle is determined, programs for the temperature controller 13 and the air conditioner controller 15 suitable for the model are stored in the ROM of the control circuit in the second ECU 2.

Alternatively, the temperature controller 13 may make an inquiry, via the interface circuit of the second ECU 2, regarding the model of the actuator connected to the communication line for the control of the interior temperature control. Then, the temperature controller 13 may detect, based on the response to the inquiry, that a specific model of the air conditioner 5 is connected.

Specifically, the temperature controller 13 may transmit to the communication line an inquiry signal including data indicating interior temperature control. As far as the inquiry signal includes data indicating interior temperature control, the air conditioner 5 may output a response including information regarding its model to the second ECU 2. Then, the temperature controller 13 may acquire the response via the interface circuit and detect that the air conditioner 5 of the model is connected, based on the information included in the acquired response.

The flash memory (or ROM of the control circuit) may store in advance the information on cooling/heating ability depending on the outside temperature as mentioned above for every model of the air conditioner 5. The temperature controller 13 may read the information regarding cooling/heating ability depending on the outside temperature, which corresponds to the air conditioner 5 detected as described above to thereby acquire the ability information of the air conditioner 5 of the model.

Alternatively, the temperature controller 13 may make an inquiry, via the interface circuit of the second ECU 2, regarding the model of the actuator connected to the communication line for the control of interior temperature. Then, the temperature controller 13 may detect, based on the response to the inquiry, that a specific model of the air conditioner 5 is connected. At the same time, the temperature controller 13 may acquire the ability information (controllable temperature range) of the air conditioner 5 of the model.

Specifically, the temperature controller 13 may transmit to the communication line an inquiry signal including data indicative of interior temperature control. As far as the inquiry signal includes data indicative of interior temperature control, the air conditioner 5 may output a response including information regarding its model to the second ECU 2. In this case, the response also may include information regarding cooling/heating ability of the air conditioner 5 of the model depending on the outside temperature. Then, the temperature controller 13 may acquire the response via the interface circuit, detect that the air conditioner 5 of the model is connected based on the model information and the cooling/heating ability information included in the acquired response, and define the ability information (controllable temperature range) of the air conditioner 5 of the model.

In this way, in one specific process that may be used for acquiring connected-device information and ability information, connected-device information and ability information are written in advance into the program of the temperature controller 13 or written as separate data into a flash memory (or ROM of the control circuit). In another specific process that may be used, the model name of the device connected to the communication line is read when the second ECU 2 is started and the regulating ability is determined using the ability information corresponding to the model of the device (i.e. using a reference table). In a still another specific process that may be used, the second ECU 2, when it is started, allows the connected device to output the ability information.

Subsequent to step 110, at step 160, a loop of steps 120 to 160 is repeated (e.g., at a cycle of one second) until controllable range determination requirements are no longer met. First, at step 120, current conditions inside and outside the vehicle are recognized. Specifically, the current outside temperature is defined based on a signal outputted from the outside temperature sensor as the sensor 3.

Then, at step 130, a controllable range of interior temperature (corresponding to an example of the second state quantity) is determined based on the ability information acquired at step 110 and the current conditions (outside temperature) acquired at step 120. Specifically, the outside temperature acquired at step 120 is applied to the ability information acquired at step 110. Thus, a controllable range of interior temperature is determined, which can be realized by the air conditioner 5 at the acquired outside temperature.

Then, at step 140, it is determined whether or not feedback requirements have been met. The feedback requirements include: (1) the second ECU 2 has been started; (2) a controllable range has been requested from the amenity controller 12, (3) the controllable range determined at step 130 of the previous loop has been changed from the controllable range determined at step 130 of a loop before the previous loop. Any one, or two or more of these three requirements may be used.

For example, if all of the three requirements (1) to (3) are used, the feedback requirements are met every time the second ECU 2 is started. Or, the feedback requirements are met every time the amenity controller 12 requests the controllable range. Or, the feedback requirements are met every time the controllable range changes as mentioned above.

If the feedback requirements are determined to be met, control proceeds to step 150. At step 150, the latest controllable range (temperature controllable range) defined at step 130 of the previous loop is outputted to the amenity controller 12. The output of the controllable range is realized by writing the controllable range into the RAM of the control circuit. After completing step 150, control proceeds to step 160. If the feedback requirements are determined not to be met at step 140, control bypasses step 150 and proceeds to step 160.

At step 160, it is determined whether or not controllable range determination requirements are met. The controllable range determination requirements are used to determine whether or not a controllable range should be continuously determined. For example, the controllable range determination requirements may have a basis on the change of the power status.

For example, while the main power supply (IG) of the vehicle is turned on, the controllable range determination requirements may be met. However, when the main power supply is turned off, the controllable range determination requirements may not be met. In this example, steps 120 to 160 are repeatedly performed while the main power supply of the vehicle is turned on.

In this way, the temperature controller 13 repeatedly defines a controllable range of vehicle interior temperature according to the ability of the air conditioner 5 connected to the communication line (step 130). When the feedback requirements are met (step 140), the defined controllable range is outputted to the amenity controller 12 (step 160).

Hereinafter is described feedback of a humidity controllable range from the humidity controller 14 to the amenity controller 12.

Parallel to the operation described above, the humidity controller 14 carries out a feedback process. In the feedback process, the humidity controller 14 repeatedly and periodically (e.g., once in a second) defines a controllable range of the vehicle interior humidity (corresponding to an example of the first state quantity) according to the ability of the actuator for controlling humidity (dehumidifier 6). Then, the humidity controller 14 outputs the defined controllable range of interior humidity (i.e. humidity controllable range) to the amenity controller 12.

The feedback process carried out by the humidity controller 14 is similar to the process illustrated in FIG. 4, which is carried out by the temperature controller 13.

Specifically, the humidity controller 14 starts the feedback process with the start of the second ECU 2. First, at step 110, the humidity controller 14 determines regulating ability as an initialization. Specifically, the humidity controller 14 acquires connected-device information and ability information. The connected-device information indicates the model name of an actuator for controlling vehicle interior humidity, which is connected to the communication line. The ability information indicates the level of the ability of the connected actuator (dehumidifier 6).

In one specific process that may be used for acquiring the connected-device information and ability information, these pieces of information are stored in advance in a flash memory (or ROM of the control circuit) of the second ECU 2 and read out. In this case, upon determining the model of the actuator to be installed in the vehicle for the control of vehicle interior humidity, connected-device information and ability information corresponding to the model are stored in the flash memory (or ROM of the control circuit). The connected-device information stored in the flash memory includes the model name of the actuator (dehumidifier 6).

Further, the ability information to be stored includes information regarding humidity regulating ability of the dehumidifier 6 of the model depending such as on interior humidity. For example, the ability information includes an interior humidity range that can be realized by the dehumidifier 6 (humidity controllable ranges) for each of 5% increments within an interior humidity range of 0% to 100%. The dehumidifier 6 is not able to raise the interior humidity higher than the current humidity. Therefore, in the interior humidity range that can be realized, the current interior humidity should be the upper limit (e.g., when current interior humidity is 50%, the humidity ranges from 50% to 40%).

Alternative to the above configuration, the connected-device information and ability information of the dehumidifier 6 may be included in a program in advance which realizes the interior humidity controller 4.

Alternatively, the humidity controller 14 may make an inquiry, via the interface circuit of the second ECU 2, regarding the model of the actuator connected to the communication line for the control of the interior humidity. Then, the humidity controller 14 may detect, based on the response to the inquiry, that a specific model of the dehumidifier 6 is connected.

Specifically, the humidity controller 14 may transmit to the communication line an inquiry signal including data indicative of interior humidity control. As far as the inquiry signal includes data indicative of interior humidity control, the dehumidifier 6 may output a response including information regarding its model to the second ECU 2. Then, the humidity controller 14 may acquire the response via the interface circuit and detect that the dehumidifier 6 of the model is connected, based on the information included in the acquired response.

The flash memory (or ROM of the control circuit) may store in advance the information on humidity regulating ability depending on the vehicle interior humidity as mentioned above for every model of the dehumidifier 6. The humidity controller 14 may read the information regarding humidity regulating ability depending on the interior humidity, which corresponds to the dehumidifier 6 detected as described above to thereby acquire the ability information of the dehumidifier 6 of the model.

Alternatively, the humidity controller 14 may make an inquiry, via the interface circuit of the second ECU 2, regarding the model of the actuator connected to the communication line for the control of the interior humidity. Then, the humidity controller 14 may detect, based on the response to the inquiry, that a specific model of the dehumidifier 6 is connected. At the same time, the humidity controller 14 may acquire the ability information of the dehumidifier 6 of the model.

Specifically, the humidity controller 14 may transmit to the communication line an inquiry signal including data indicative of interior humidity control. As far as the inquiry signal includes data indicative of interior humidity control, the dehumidifier 6 may output a response including information regarding its model to the second ECU 2. In this case, the response may also include information regarding humidity control ability of the dehumidifier 6 of the model depending on the vehicle interior humidity. Then, the humidity controller 14 may acquire the response via the interface circuit, detect that the dehumidifier 6 of the model is connected, based on the model information and the humidity regulating ability information included in the acquired response, and define the ability information of the dehumidifier 6 of the model.

In this way, in one specific process that may be used for acquiring connected-device information and ability information, connected-device information and ability information are written in advance into the program of the humidity controller 14 or written as separate data into a flash memory (or ROM of the control circuit). In another specific process that may be used, the model name of the device connected to the communication line is read when the second ECU 2 is started and the regulating ability is determined using the ability information corresponding to the model of the device (i.e. using a reference table). In a still another specific process that may be used, the second ECU 2, when it is started, allows the connected device to output the ability information.

Subsequent to step 110, at step 160, a loop of steps 120 to 160 is repeated (e.g., at a cycle of one second) until controllable range determination requirements are no longer met. First, at step 120, current conditions inside the vehicle are recognized. Specifically, the current interior humidity is defined based on a signal outputted from the interior humidity sensor as the sensor 3.

Then, at step 130, a controllable range of the interior humidity (corresponding to an example of the first state quantity) is determined based on the ability information acquired at step 110 and the current conditions (interior humidity) acquired at step 120. Specifically, the interior humidity acquired at step 120 is applied to the ability information acquired at step 110. Thus, a controllable range of interior humidity is determined, which can be realized by the dehumidifier 6 at the acquired vehicle interior humidity. The subsequent steps 140 to 160 are the same as those performed by the temperature controller 13 and thus the detailed explanation is omitted. However, the output at step 150 corresponds to the controllable range of the interior humidity (humidity controllable range) defined at step 130.

In this way, the humidity controller 14 repeatedly defines a controllable range of interior humidity suitable for the ability of the actuator (dehumidifier 6) connected to the communication line, for the control of the interior humidity (step 130). Then, when feedback requirements are met (step 140), the humidity controller 14 outputs the defined controllable range to the amenity controller 12 (step 160).

Hereinafter is described a process performed by the amenity controller 12 which is fed back with controllable ranges from the temperature controller 13 and the humidity controller 14. The amenity controller 12 repeatedly (e.g. once in a second) executes the process shown in FIG. 5 to determine a target temperature and a target humidity based on the fed back controllable ranges.

Figure 5:
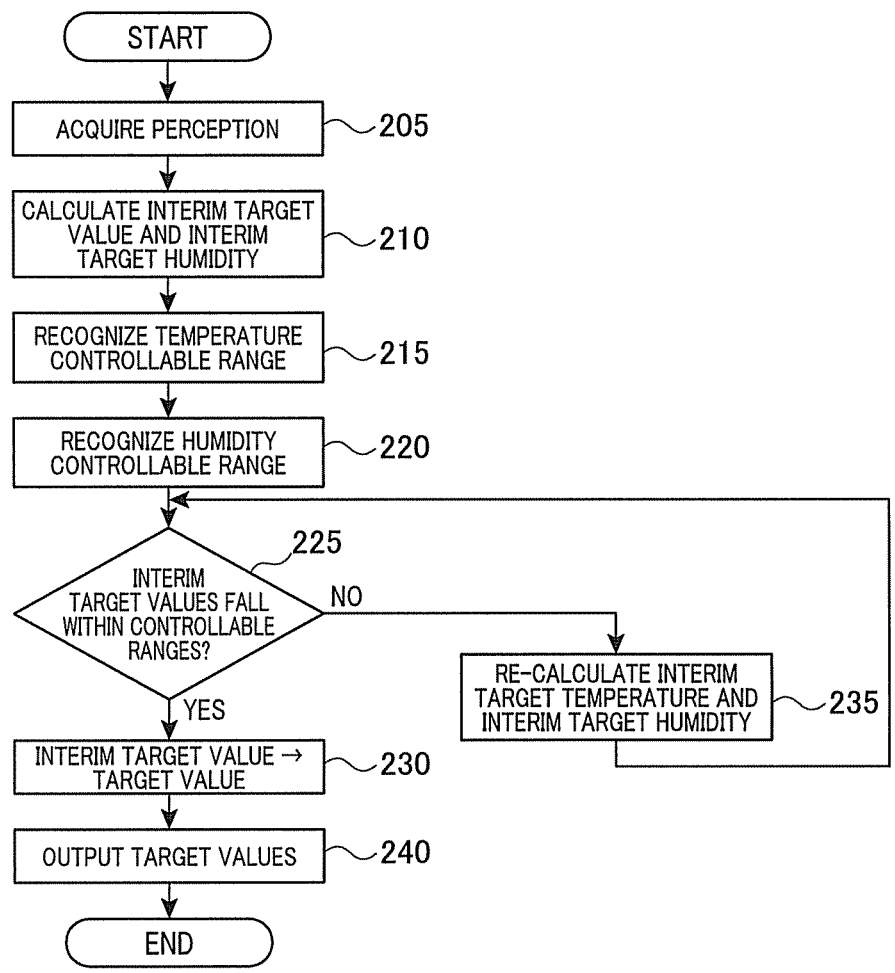
FIG. 5 is a flow diagram illustrating a process performed by an amenity controller in the system.

FIG. 5 is a flow diagram illustrating the process. First, at step 205, the amenity controller 12 acquires a signal outputted from the amenity request processor 11. In other words, the amenity controller 12 acquires a signal indicating a temperature-humidity index range (corresponding to an example of the user's desire).

At the subsequent step 210, the amenity controller 12 calculates an interim target value of the interior humidity (corresponding to an example of the first state quantity) and an interim target value of the interior temperature (corresponding to an example of the second state quantity) for the purpose of controlling the interior humidity and interior temperature of the vehicle in conformity with the perception (temperature-humidity index range) acquired at step 205. The calculated interim target value of the interior humidity is referred to as an "interim target humidity", while the calculated interim target value of the interior temperature is referred to as an "interim target temperature".

Specifically, the amenity controller 12 refers to data prepared in advance, which correlates "temperature-humidity index", "humidity h" and "temperature t" of the vehicle interior. Based on the data, the amenity controller 12 calculates an interim target humidity of the humidity h and an interim target temperature of the temperature t so as to fall within the temperature-humidity index range acquired at step 205.

Specifically, the flash memory of the second ECU 2 (or ROM of the control circuit) stores in advance the following relation as data correlating "temperature-humidity index", "humidity h" and "temperature t":

(Temperature-humidity index)=0.81+0.01$h$×(0.99$t$−14.3)+46.3

Using the above relation, the amenity controller 12 determines an interim target humidity of the humidity h and an interim target temperature of the temperature t so as to fall within the identified temperature-humidity index range.

More specifically, the amenity controller 12 calculates a representative value (or a central value, or an upper limit, or a lower limit) of the identified temperature-humidity index range. Then, the amenity controller 12 substitutes the representative value into the left-hand side of the above relation. After the substitution, the amenity controller 12 determines the humidity h and the temperature t which satisfy the relation. Thus, the amenity controller 12 uses the resultant humidity h as an interim target humidity, and the resultant temperature t, as an interim target temperature.

For example, the amenity controller defines the current interior temperature of the vehicle based on a signal currently outputted from the interior temperature sensor as the sensor 3. Then, the amenity controller 12 calculates a value offset from the defined interior temperature by a predetermined offset temperature. The offset value as the temperature t is substituted into the above relation, followed by determining the humidity h that satisfies the above relation.

Then, the amenity controller 12 uses the substituted temperature t as an interim target temperature, and the calculated interior humidity, as an interim target humidity. The offset temperature may be set to a positive value (e.g., 2° C.) when the acquired temperature-humidity index range is 60 or less, or may be set to zero when the range is from 60 to 75, or may be se to a negative value (e.g., −2° C.) when the range is 75 or more.

In this way, at step 210, the amenity controller 12 calculates an interim target humidity (corresponding to an example of the interim target value of the first state quantity) and an interim target temperature (corresponding to an example of the interim target value of the second state quantity).

Subsequently, at step 215, the amenity controller 12 recognizes the latest temperature controllable range outputted from the interior temperature controller 13. Specifically, the amenity controller 12 reads the latest temperature controllable range that has been stored in the RAM by the interior temperature controller 13. Then, at step 220, the amenity controller 12 recognizes the latest humidity controllable range outputted by the interior humidity controller 14. Specifically, the amenity controller 12 reads the latest humidity controllable range stored in the RAM by the interior humidity controller 14.

Then, at step 225, the amenity controller 12 determines whether or not the interim target values (the interim target temperature and the interim target humidity) calculated at step 210 fall within the respective controllable ranges acquired at steps 215 and 220.

More specifically, if both of the interim target temperature and the interim target humidity fall within the respective controllable ranges, the amenity controller 12 makes an affirmative determination (YES) at step 225 and then control proceeds to step 230. If either of the interim target temperature and the interim target humidity falls out of the controllable range, the amenity controller 12 makes a negative determination (NO) at step 225 and then control proceeds to step 235.

If both of the interim target values fall within the respective controllable ranges, the amenity controller 12 determines, at step 230, the interim target temperature to be a target value of the interior temperature of the vehicle (hereinafter also referred to as "target temperature), and the interim target humidity to be a target value of the interior humidity of the vehicle (hereinafter also referred to as "target humidity").

At the subsequent step 240, the amenity controller 12 outputs the target values determined at step 230. Specifically, the amenity controller 12 outputs the target temperature to the temperature controller 13 and the target humidity to the humidity controller 14.

If either of the interim target values falls out of the controllable range, the amenity controller 12 re-calculates, at step 235, an interim target temperature and an interim target humidity. In this case, the following re-calculation processes (A) to (E) may be used.

(A) The case where the interim target temperature falls within the controllable range and the interim target humidity is lower than the lower limit of the controllable range (e.g., 50% to 60%):

In this case, the amenity controller 12 changes the interim target humidity so as to be equal to the lower limit (50%) of the controllable range. Then, the amenity controller 12 substitutes the changed interim target humidity (50%) into the humidity h in the relation set forth above, which is again provided below:

(Temperature-humidity index)=0.81+0.01$h$×(0.99$t$−14.3)+46.3

Then, the amenity controller 12 substitutes the representative value of the temperature-humidity index range identified at step 210 into the temperature-humidity index in the relation. Then, the amenity controller 12 determines an temperature t that falls within the controllable range and satisfies the above relation, for use as an interim target temperature of the vehicle interior temperature.

(B) The case where the interim target temperature falls within the controllable range and the interim target humidity is more than the upper limit of the controllable range (e.g., 50% to 60%):

In this case, the amenity controller 12 changes the interim target humidity so as to be equal to the upper limit (60%) of the controllable range. Then, the amenity controller 12 substitutes the changed interim target humidity (60%) into the humidity h in the above relation, and also substitutes the representative value of the temperature-humidity index range identified at step 210 into the temperature-humidity index in the relation. Then, the amenity controller 12 determines a temperature t that falls within the controllable range and satisfies the above relation, for use as an interim target temperature of the vehicle interior temperature.

(C) The case where the interim target humidity falls within the controllable range and the interim target temperature is lower the lower limit of the controllable range (e.g., 22° C. to 28° C.):

In this case, the amenity controller 12 changes the interim target temperature so as to be equal to the lower limit (22° C.) of the range. Then, the amenity controller 12 substitutes the changed interim target temperature (22° C.) into the temperature t in the above relation and also substitutes the representative value of the temperature-humidity index range identified at step 210 into the temperature-humidity index in the above relation. Then, the amenity controller 12 determines a humidity h that falls within the controllable range and satisfies the above relation, for use as an interim target humidity of the vehicle interior humidity.

(D) The case where the interim target humidity falls within the controllable range and the interim target temperature is more than the upper limit of the controllable range (e.g., 22° C. to 28° C.):

In this case, the amenity controller 12 changes the interim target temperature so as to be equal to the upper limit (28° C.) of the range. Then, the amenity controller 12 substitutes the changed interim target temperature (28° C.) into the temperature t in the above relation, and also substitutes the representative value of the temperature-humidity index range identified at step 210 into the temperature-humidity index in the above relation. Then, the amenity controller 12 determines a humidity h that falls within the controllable range and satisfies the above relation, for use as an interim target humidity of the vehicle interior humidity.

(E) The case where both of the interim target humidity and the interim target temperature are out of the respective controllable ranges:

In this case, any of processes (A) to (D) set forth above may be used.

In processes (A) and (B), in the event that a temperature t that satisfies the above relation fails to fall within the controllable range, the amenity controller 12 may change the temperature-humidity index within the temperature-humidity index range acquired at step 205, followed by substitution of the changed temperature-humidity index into the above relation. Then, the amenity controller 12 may determine a temperature t that falls within the controllable range and satisfies the above relation, for use as an interim target temperature of the vehicle interior temperature.

In processes (C) and (D), in the event that a humidity h that satisfies the above relation fails to fall within the controllable range, the amenity controller 12 may change the temperature-humidity index within the temperature-humidity index range acquired at step 205, followed by substitution of the changed temperature-humidity index into the above relation. Then, the amenity controller 12 may determine a humidity h that falls within the controllable range and satisfies the above relation, for use as an interim target humidity of the vehicle interior humidity.

When the interim target temperature falls within the controllable range and the interim target humidity falls out of the controllable range, use of processes (A) and (B) can correct the interim target humidity that falls out of the controllable range as well as the interim target temperature that does not fall out of the controllable range. As a result of the correction, these interim target temperature and interim target humidity are permitted to fall within the range in which the vehicle interior conditions can be controlled according to the user's desire (to fall within the temperature-humidity index range of 55 to 60 corresponding to "quite cold").

When the interim target humidity falls within the controllable range and the interim target temperature falls out of the controllable range, use of processes (C) and (D) enables correction of the interim target temperature that falls out of the controllable range as well as the interim target humidity that does not fall out of the controllable range. As a result of the correction, these interim target temperature and interim target humidity are permitted to fall within the range in which the vehicle interior conditions can be controlled according to the user's desire (to fall within the temperature-humidity index range of 55 to 60 corresponding to "quite cold").

Thus, the feedback performed by one of the temperature controller 13 and the humidity controller 14 acts on the control of the other of the controllers.

After step 235, control proceeds to step 230. At step 230, the amenity controller 12 determines, as mentioned above, the interim target temperature as a target temperature and the interim target humidity as a target humidity. Then, at step 240, the amenity controller 12 outputs the target temperature to the temperature controller 13 and the target humidity to the humidity controller 14.

Thus, the temperature controller 13 and the humidity controller 14 define the controllable ranges of the state quantities of the vehicle so as to be suitable for the ability of the actuators 5 and 6. Then, these controllers output (feed back) the defined controllable ranges to the amenity controller 12. Then, the amenity controller 12 calculates target values of the sate quantities (interior temperature and interior humidity of the vehicle) so as to fall within the respective controllable ranges of the state quantities. Therefore, the probability for the amenity controller 12 to output target values that cannot be realized by the actuators 5 and 6 is reduced. Such unrealizable target values would otherwise have been outputted to the controllers 13 and 14, due to the silence of these controllers about the specific structural varieties of the actuators 5 and 6, against the amenity controller 12.

In the event either one of the two interim target values (the interim target temperature and the interim target humidity) is out of the controllable range, the correction of both of the interim target values enables more quick and more efficient control of the vehicle interior conditions in line with the user's desire. This owes to the feedback of the controllable ranges to the amenity controller 12 from the plurality of state-equipment converting means (temperature controller 13 and humidity controller 14). Further, owing to the feedback, the amenity controller 12 is able to output target values of different state quantities to the respective controllers.

(Second Embodiment)

Figure 6:
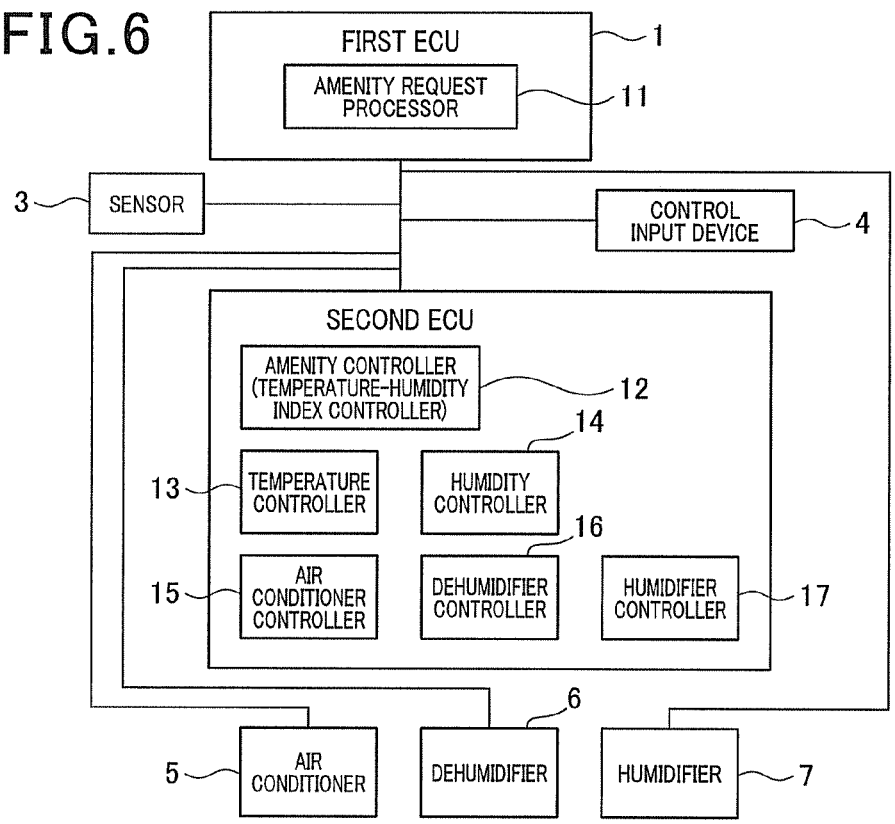
FIG. 6 is a schematic diagram illustrating a configuration of an on-vehicle control system according to a second embodiment of the disclosure.
Figure 7:
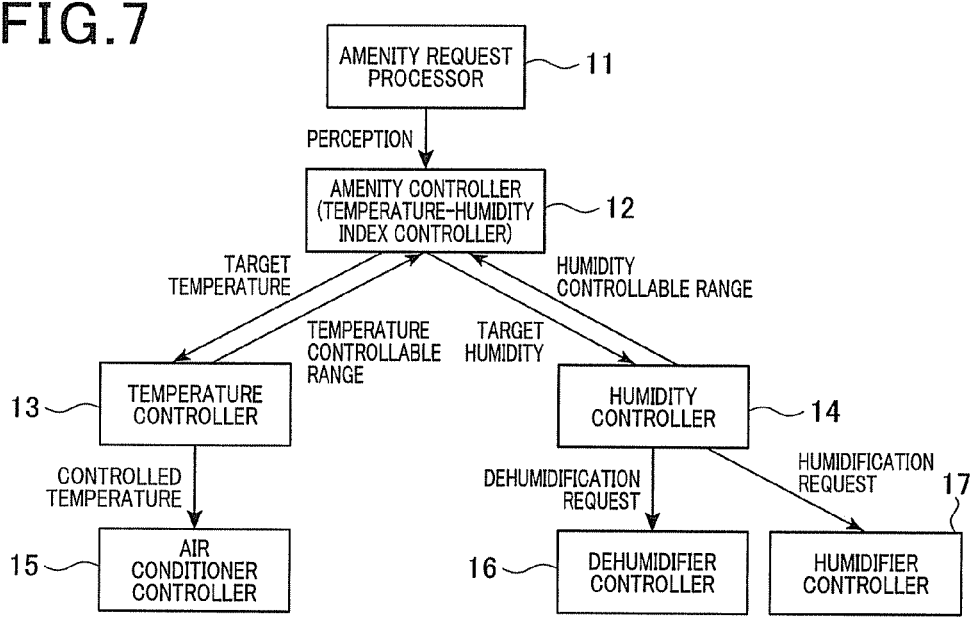
FIG. 7 is a schematic diagram illustrating a hierarchical structure of functional units in the system according to the second embodiment.

Referring now to FIGS. 6 and 7, hereinafter is described a second embodiment of the disclosure. The second embodiment is described focusing on the differences from the first embodiment. It should be appreciated that in the second and the subsequent embodiments, the components identical with or similar to those in the first embodiment are given the same reference numerals for the sake of omitting unnecessary explanation.

FIG. 6 is a schematic diagram illustrating a configuration of an on-vehicle control system according to the second embodiment. As shown in FIG. 6, the vehicle that installs the system of the second embodiment is provided with a humidifier 7. The control circuit of the second ECU 2 executes a predetermined program stored in the ROM to function as a humidifier controller 17 (corresponding to an example of the first equipment control means).

The humidifier 7 (corresponding to an example of the first actuator) is a well-known device that controls humidity in the interior of the vehicle. Under the control of the humidifier 7 as well as the dehumidifier 6, the humidity in the vehicle interior can be increased or decreased.

FIG. 7 is a schematic diagram illustrating a hierarchical structure of functional units in the system. Specifically, FIG. 7 shows a functional hierarchical structure of the amenity request processor 11, amenity controller 12, interior temperature controller 13, interior humidity controller 14, air conditioner controller 15, dehumidifier controller 16 and humidifier controller 17. The functions of the amenity request processor 11, amenity controller 12, temperature controller 13, air conditioning controller 15 and dehumidifier controller 16 are the same as those of the first embodiment.

The humidity controller 14 periodically (e.g., once a second) reads and acquires a target humidity (corresponding to an example of the target value of the first state quantity) outputted by the amenity controller 12 and stored in the RAM. Then, in conformity with the acquired target humidity, the humidity controller 14 outputs a control value for the dehumidifier 6 to the dehumidifier controller 16 and also outputs a control value for the humidifier 7 to the humidifier controller 17.

Specifically, the humidity controller 14 defines the current interior humidity based on a signal outputted from the interior humidity sensor as the sensor 3 for the comparison of the current interior humidity with the target humidity. Then, if the target humidity is lower than the current humidity, the humidity controller 14 outputs a control value (dehumidification request) to the dehumidifier controller 16 to activate the dehumidifier 6. At the same time, the humidity controller 14 outputs a control value to the humidifier controller 17 to stop the humidifier 7.

On the other hand, if the target humidity is equal to or higher than the current humidity, the humidity controller 14 outputs a control value to the dehumidifier controller 16 to stop the dehumidifier. At the same time, the humidity controller 14 outputs a control value (humidification request) to the humidifier controller 17 to activate the humidifier 7. In this case, the output of the control value is realized by writing the control value into the RAM of the control circuit.

The humidifier controller 17 periodically (e.g., once a second) reads and acquires the control value for the humidifier 7 outputted from (written into the RAM by) the humidity controller 14. Then, the humidifier controller 17 controls the humidifier 7 according to the acquired control value.

Specifically, when a control value indicating activation of the humidifier 7 is acquired while the humidifier 7 is actually activated, the activation of the humidifier 7 is continued as it is. When a control value indicating stopping of the humidifier 7 is acquired while the humidifier 7 is activated, the humidifier 7 is stopped. Further, when a control value indicating activation of the humidifier 7 is acquired while the humidifier 7 is stopped, the humidifier 7 is started. When a control value indicating stopping of the humidifier 7 is acquired while the humidifier 7 is actually stopped, the humidifier 7 is permitted to stay as being stopped.

The process of feeding back data regarding humidity controllable range from the humidity controller 14 to the amenity controller 12 is similar to that of the first embodiment. In other words, the humidity controller 14 periodically (e.g., once in a second) defines a controllable range of the vehicle interior humidity (corresponding to an example of the first state quantity) suitable for the abilities of the humidity control actuators (dehumidifier 6 and humidifier 7) and outputs the defined range of the vehicle interior humidity to the amenity controller 12.

However, the humidity controllable range determined by the humidity controller 14 at step 130 of FIG. 4 is different between the first and second embodiments. Specifically, in the first embodiment, the upper limit of the controllable range has been made equal to the current interior humidity of the vehicle. However, in the present embodiment, the upper limit of the controllable range is set to be higher than the current interior humidity of the vehicle. For example, the range of ±20% with reference to the current humidity may be used as a humidity controllable range.

The humidity controller 14 may make an inquiry, via the interface circuit of the second ECU 2, regarding the model of the actuator connected to the communication line for the control of the humidity. Then, based on the response to the inquiry, the humidity controller 14 may detect that a specific model of humidifier 7 or dehumidifier 6 is connected. In this case, at step 110 of determining regulating ability, the humidifier 7, for example, can output a response that includes its model information to the second ECU 2, as far as data indicative of humidity control is included in the inquiry. Then, the humidity controller 14 acquires the response via the interface circuit and, based on the model information included in the acquired response, can detect that the humidifier 7 of the model is connected to the communication line.

With this configuration, the humidity controller 14 is able to change the controllable range when both of the dehumidifier 6 and the humidifier 7 are connected, or when only the dehumidifier 6 is connected, or when only the humidifier 7 is connected, as actuator(s) for controlling the interior humidity of the vehicle. In this case, depending on the conditions, the change of the controllable range may be based on the ability information of each model in the data stored in advance in a flash memory (or ROM), or based on the ability information of the connected actuator outputted from the actuator per se.

In the first and second embodiments, the first ECU 1 includes the amenity request processor 11 as an example of the user's desire outputting means. Further, the second ECU 2 includes the amenity controller as an example of the desire-state converting means, the humidity controller 14 as an example of the first state-equipment converting means, the temperature controller 13 as an example of the second state-equipment converting means, the dehumidifier controller 16 (and humidifier controller 17 in the second embodiment) as an example of the first equipment control means, and the air conditioner controller 15 as an example of the second equipment control means.

With this configuration, a sensor or a control input device for indicating a user's desire can be easily changed. Various devices can be appropriately used as the sensor or the control input device for transmitting a user's desire. For example, such devices include a control panel provided with specific switch buttons, a touch panel having a display on which switch buttons are shown for touch input, a distance control device operated by combining switches mounted to a steering with a display in a distance, a voice recognition device, a vehicle interior temperature sensor, and a vehicle interior humidity sensor.

Thus, the user's desire inputting means is installed in the first ECU 1 to output a signal indicative of a user's desire in response to a signal outputted from such a sensor or control input device. On the other hand, the desire-state converting means, the first state-equipment converting means and the first equipment control means are installed in the second ECU 2. In this way, when the sensor or the control input device is changed, the change of only the first ECU 1 suffices, without the need of changing the second ECU 2. This configuration is advantageous when a variety of sensors or control input devices are desired to be prepared for a plurality of vehicles.

(Third Embodiment)

Figure 8:
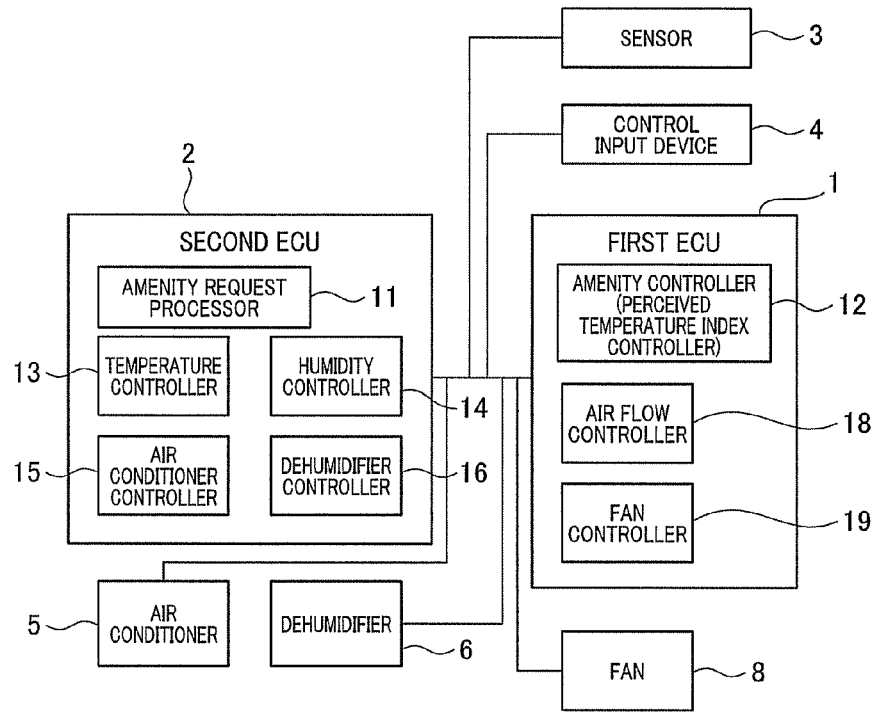
FIG. 8 is a schematic diagram illustrating a configuration of an on-vehicle control system according to a third embodiment of the disclosure.

Referring to FIGS. 8 to 11, hereinafter is described a third embodiment of the disclosure. The third embodiment is described focusing on the differences from the first embodiment. FIG. 8 is a schematic diagram illustrating a configuration of an on-vehicle control system according to the third embodiment. As shown in FIG. 8, the third embodiment is different from the first embodiment in that an interior fan 8 (hereinafter also just referred to as "fan 8") is installed in the vehicle and that the control circuit of the first ECU 1 functions as an air flow controller 18 or an interior fan controller 19 (hereinafter also just referred to as "fan controller 19") by executing a predetermined program in the ROM.

Further, in the third embodiment, the arrangement of the functional units 11 to 16 in the first and second ECUs 1 and 2 is also different from that of the first embodiment. Specifically, the first ECU 1 of the present embodiment includes the amenity controller 12. The second ECU 2 of the present embodiment includes the amenity request processor 11, interior temperature controller 13, interior humidity controller 14, air conditioner controller 15 and dehumidifier controller 16.

The fan 8 (corresponding to an example of the second actuator) is a well-known device that generates air flow in a vehicle interior by rotating a fan.

Figure 9:
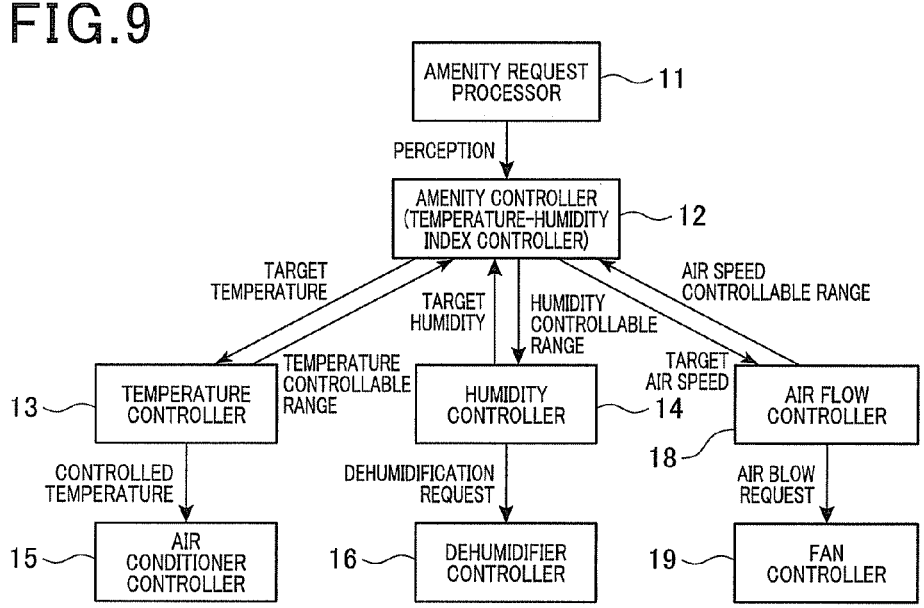
FIG. 9 is a schematic diagram illustrating a hierarchical structure of functional units in the system according to the third embodiment.
Figure 10:
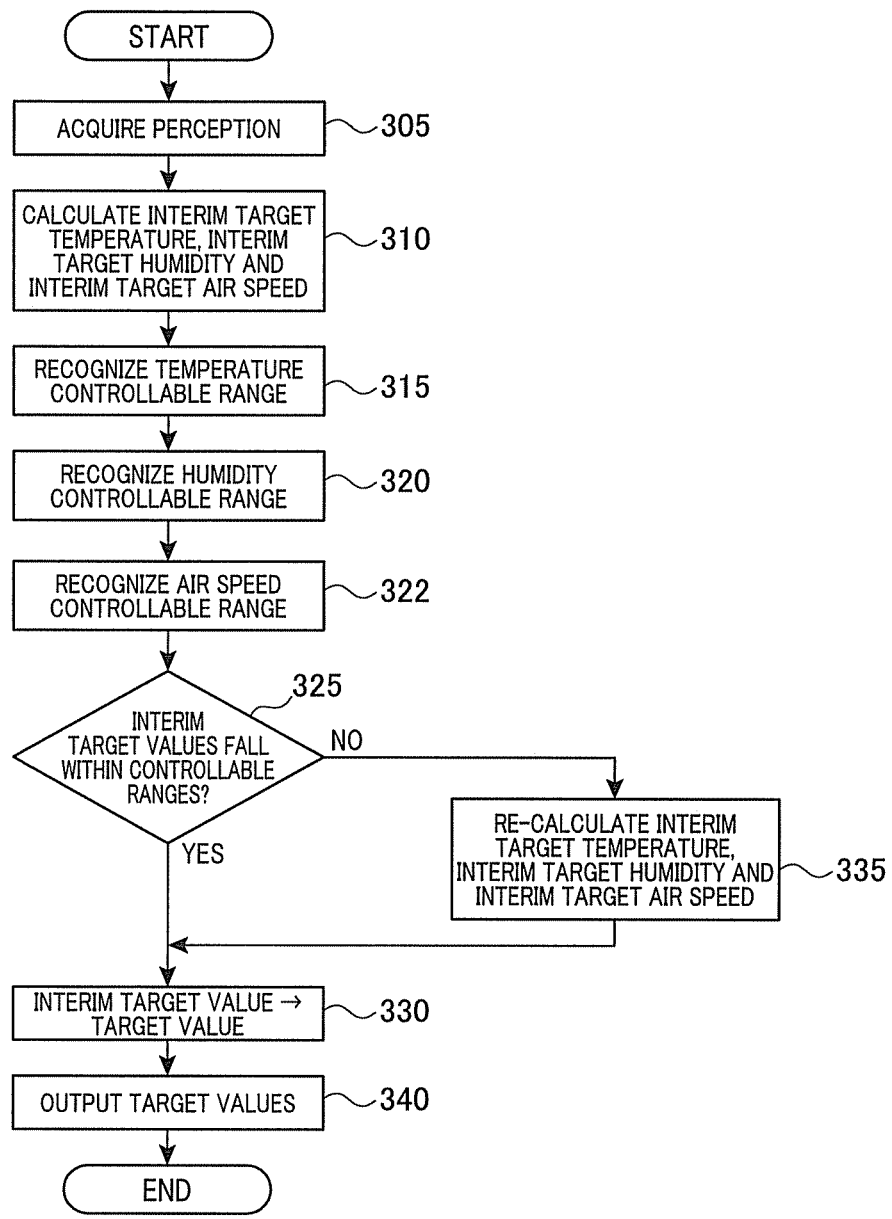
FIG. 10 is a flow diagram illustrating a process performed by an amenity controller in the system according to the third embodiment.

FIG. 9 is a diagram illustrating a hierarchical structure of functions exerted by the amenity request processor 11, amenity controller 12, temperature controller 13, humidity controller 14, air conditioner controller 15, dehumidifier controller 16, humidifier controller 17, air flow controller 18 and fan controller 19. The functions of the temperature controller 13, humidity controller 14, air conditioner controller 15 and dehumidifier controller 16 are the same as those of the first embodiment.

The amenity request processor 11 functions in the same manner as in the first embodiment by outputting a signal indicative of a user's desire in response to the signal outputted from the sensor 3 and the control input device 4. However, in details, the amenity request processor 11 of the present embodiment is different from that of the first embodiment. Specifically, the amenity request processor 11 acquires a signal (e.g., signal indicating that the "quite cold" button has been operated) outputted from the control input device 4. At the same time, the amenity request processor 11 of the present embodiment outputs a range of a target perceived temperature as the user's desire corresponding to the signal.

More specifically, the first ECU 1 has a flash memory (or ROM of the control circuit) that stores data which correlates user's desired perceptions (e.g., desire of feeling "quite cold" in the vehicle interior) to ranges of perception that meet the respective user's desired perceptions. The amenity request processor 11 acquires a signal (perception) outputted from the control input device 4 and identifies a range of perceived temperature corresponding to the perception (perceived temperature that would meet the user's desire) indicated by the acquired signal.

The amenity controller 12 functions in a manner substantially similar to the first embodiment. That is, the amenity controller 12 controls the vehicle interior conditions according to the user's desire indicated by the signal outputted from the amenity request processor 11. To this end, the amenity controller 12 calculates target values of the state quantities of the vehicle (interior temperature and interior humidity) and outputs the calculated target values to the temperature controller 13 and the humidity controller 14. However, the present embodiment differs from the first embodiment in that the user's desire is provided in terms of a target range of perceived temperature rather than a target range of temperature-humidity index.

Another difference of the present embodiment from the first embodiment is that the amenity controller 12 also calculates a target value of air speed (corresponding to an example of the second state quantity) in the vehicle interior (hereinafter also referred to as "target air speed") and outputs the calculated air speed to the air flow controller 18. The calculated target air speed is used for controlling the vehicle interior conditions in conformity with the target perceived temperature range indicated by the signal outputted from the amenity request processor 11. The details of the amenity controller 12 of the present embodiment will be described later.

The air flow controller 18 (corresponding to an example of the second state-equipment converting means) of the present embodiment periodically reads and acquires the target air speed (corresponding to an example of the target value of the second state quantity) outputted by the amenity controller 12 and stored in the RAM. In order to realize the acquired target air speed, the air flow controller 18 outputs a control value (air blow request) for the fan 8 to the fan controller 19. Specifically, the air flow controller 18 multiplies the target air speed with a predetermined proportionality coefficient to define a fan revolution (number of revolutions of the fan 8 per minute). Then, the air flow controller 18 outputs the defined fan revolution as a control value to the fan controller 19. In this case, the output of the fan revolution rate is realized by writing the fan revolution into the RAM of the control circuit.

The fan controller 19 (corresponding to an example of the second equipment control means) periodically (e.g., once in a second) reads and acquires the fan revolution (control value) outputted from (written into the RAM by) the air flow controller 18. Then, the fan controller 19 controls the fan 8 in conformity with the acquired fan revolution.

Hereinafter, feedback from the air flow controller 18 to the amenity controller 12 is described. Parallel to the operation described above, the air flow controller 18 periodically (e.g., once in a second) defines a controllable range of the air speed (corresponding to an example of the second state quantity) in the vehicle interior suitable for the ability of the fan 8. Then, the air flow controller 18 carries out a feedback process to output the defined controllable range of air speed to the amenity controller 12.

The feedback process carried out by the air flow controller 18 is similar to the one shown in FIG. 4, which is carried out by the temperature controller 13 or the humidity controller 14. The air flow controller 18 is ensured to start the feedback process when the second ECU 2 is started. First, at step 110, the air flow controller 18 determines regulating ability as an initialization. Specifically, the air flow controller 18 acquires connected-device information and ability information. The connected-device information indicates the model name of an actuator for controlling vehicle interior air speed, which is connected to the communication line. The ability information indicates the level of the air blowing ability of the connected actuator (fan 8).

In one specific process that may be used for acquiring the connected-device information and ability information, these pieces of information are stored in advance in a flash memory (or ROM of the control circuit) of the second ECU 2 and, read out. In this case, upon determining the model of the fan 8 to be installed in the vehicle, connected-device information and ability information corresponding to the model are stored in the flash memory (or ROM of the control circuit). The connected-device information stored in the flash memory includes the model name of the fan 8. Further, the ability information stored in the flash memory includes information regarding air speed in the vehicle interior, which can be realized by the fan 8. Alternative to the above, the connected-device information and ability information may be included in advance in a program executed by the air flow controller 18.

Alternatively, the air flow controller 18 may make an inquiry, via the interface circuit of the second ECU 2, regarding the model of the actuator connected to the communication line for the control of the air speed in the vehicle interior. Then, the air flow controller 18 may detect, based on the response to the inquiry, that a specific model of the fan 8 is connected.

Specifically, the air flow controller 18 may transmit to the communication line an inquiry signal including data indicative of air speed control. As far as the inquiry signal includes data indicative of air speed control, the fan 8 may output a response including information regarding its model to the second ECU 2. Then, the air flow controller 18 may acquire the response via the interface circuit, and detect that the fan 8 of the model is connected, based on the model information included in the acquired response.

The flash memory (or ROM of the control circuit) stores information regarding the range of air speed that can be realized, for each model of the fan 8. Thus, the air flow controller 18 is able to acquire the ability information of the fan 8 detected as described above.

Alternatively, the air flow controller 18 may make an inquiry, via the interface circuit of the second ECU 2, regarding the model of the actuator connected to the communication line for the control of the air speed in the vehicle interior. Then, the air flow controller 18 may detect, based on the response to the inquiry, that a specific model of the fan 8 is connected, and at the same time, may acquire the ability information of the fan 8 of the model.

Specifically, the air flow controller 18 may transmit to the communication line an inquiry signal including data indicative of air speed control. As far as the inquiry signal includes data indicative of air speed control, the fan 8 may output a response including information regarding its model to the second ECU 2. In this case, the response should include information regarding the range of air speed that can be realized by the model. Then, the air flow controller 18 may acquire the response via the interface circuit to detect that the fan 8 of the model is connected, based on the information regarding the model and regarding the realizable range of air speed and, at the same time, define the ability information of the fan 8 of the model.

Subsequent to step 110, at step 160, a loop of steps 120 to 160 is repeated (e.g., once a second) until controllable range determination requirements are no longer met. However, in the present embodiment, control directly proceeds to step 130, omitting step 120. At step 130, the air flow controller 18 determines a controllable range of air speed (corresponding to an example of the second state quantity) based on the ability information acquired at step 110. Since the subsequent steps 140 to 160 are the same as those performed by the temperature controller 13, explanation is omitted. However, the output at step 150 corresponds to the controllable range of the air speed (air speed controllable range) defined at step 130.

In this way, the air flow controller 18 repeatedly defines a controllable range of air speed in the vehicle interior suitable for the ability of the actuator (fan 8) connected to the communication line, for the control of the air speed (step 130). Then, when feedback requirements are met (step 140), the air flow controller 18 outputs the defined controllable range to the amenity controller 12 (step 160).

Hereinafter is described a process performed by the amenity controller 12 which obtains feedback from the temperature controller 13, the humidity controller 14 and the air flow controller 18. The amenity controller 12 repeatedly (e.g. at a cycle of one second) executes a process illustrated in a flow diagram of FIG. 10 to determine a target temperature, a target humidity and a target air speed based on the feedback.

First, at step 305, the amenity controller 12 acquires a signal outputted from the amenity request processor 11. In other words, the amenity controller 12 acquires a signal indicating a user's perceived temperature range (corresponding to an example of the user's desire).

At the subsequent step 310, the amenity controller 12 calculates an interim target value of the interior humidity, an interim target value of the interior temperature and an interim target value the air speed, for the purpose of controlling the interior humidity, interior temperature and interior air speed of the vehicle in conformity with the perceived temperature range acquired at step 305. The calculated interim target value of the interior humidity is referred to as an "interim target humidity", the calculated interim target value of the interior temperature is referred to as an "interim target temperature" and the calculated interim target value of the interior air flow is referred to as an "interim target air speed".

Specifically, the amenity controller 12 refers to data prepared in advance, which correlates "perceived temperature", "humidity h", "temperature t" and "air speed v" in the vehicle interior. Based on the data, the amenity controller 12 calculates an interim target humidity of the humidity h, an interim target temperature of the temperature t and an interim target air speed of the air speed v so as to fall within the perceived temperature range acquired from the amenity request processor 11.

Specifically, the flash memory of the second ECU 2 (or ROM of the control circuit) stores in advance the following relation as the data correlating "temperature-humidity index", "humidity h", "temperature t" and "air speed v":

(Perceived temperature)=37−(37−$t$)/(0.68−0.0014×$h$+ 1/$A$)−0.29×$t$×(1−$h$/100), where, $A=1.76+1.4\times v^{0.75}$ Using the above relation, the amenity controller 12 determines an interim target humidity of the humidity h, an interim target temperature of the temperature t and an interim target air speed of the air speed v so as to fall within the perceived temperature range acquired from the amenity request processor 11.

More specifically, the amenity controller 12 calculates a representative value (or a central value, or an upper limit, or a lower limit) of the perceived temperature range acquired from the amenity request processor 11. Then, the amenity controller 12 substitutes the representative value into the left-hand side of the above relation. After the substitution, the amenity controller 12 determines the humidity h, the temperature t and the air speed v, which satisfy the relation. Thus, the amenity controller 12 uses the resultant humidity h as an interim target humidity, the resultant temperature t, as an interim target temperature, and the resultant air speed v, as an interim target air speed.

For example, the amenity controller 12 defines the current interior temperature of the vehicle based on a signal currently outputted from the interior temperature sensor as the sensor 3. Then, the amenity controller 12 calculates a value offset from the defined interior temperature by a predetermined value (this value is referred to as "offset temperature"). The offset value as the temperature t is substituted into the above relation. Also, any one of predetermined three (or four or more) different preset air speed values is selected as the air speed v and substituted into the above relation. Further, the humidity h is determined so that the above relation is satisfied.

Thus, the amenity controller 12 uses the substituted temperature t and air speed v as an interim target temperature and an interim air speed, respectively, and the calculated humidity h, as an interim target humidity. The offset temperature may be set in a manner similar to the first embodiment.

A preset air speed value may be selected as follows. Specifically, if the acquired perceived temperature is less than a first threshold, a minimum preset air speed value (e.g., air speed zero) may be selected. If the acquired perceived temperature is equal to or more than the first threshold but less than a second threshold, an intermediate preset air speed value may be selected. If the acquired perceived temperature is equal to or more than the second threshold, a maximum preset air speed value may be selected. It should be appreciated that the second threshold is larger than the first threshold.

Thus, at step 310, the amenity controller 12 calculates an interim target humidity, an interim target temperature and an interim target air speed.

Subsequently, at step 315, the amenity controller 12 recognizes the latest temperature controllable range outputted from the interior temperature controller 13. Specifically, the amenity controller 12 reads the latest temperature controllable range that has been stored in the RAM by the interior temperature controller 13. Then, at step 320, the amenity controller 12 recognizes the latest humidity controllable range outputted by the interior humidity controller 14. Specifically, the amenity controller 12 reads the latest humidity controllable range stored in the RAM by the interior humidity controller 14. At the subsequent step 322, the amenity controller 12 recognizes the latest air speed controllable range outputted by the air flow controller 18. Specifically, the amenity controller 12 reads the latest air speed controllable range stored in the RAM by the air flow controller 18.

Then, at step 325, the amenity controller 12 determines whether or not the interim target values (the interim target temperature, the interim target humidity and the interim target air speed) calculated at step 310 fall within the respective controllable ranges acquired at steps 315, 320 and 322.

More specifically, if all of the interim target temperature, the interim target humidity and the interim target air speed fall within the respective controllable ranges, the amenity controller 12 makes an affirmative determination (YES) at step 325 and then control proceeds to step 330. If one or more of the interim target temperature, the interim target humidity and the interim target air speed falls out of the controllable range (for the interim target temperature, the temperature controllable range; for the interim target humidity, the humidity controllable range; and for the interim target air speed, the air speed controllable range), the amenity controller 12 makes a negative determination (NO) at step 325 and then control proceeds to step 335.

If all of the three interim target values fall within the respective controllable ranges, the amenity controller 12 determines, at step 330, the interim target temperature is set to be a target value of the interior temperature of the vehicle (hereinafter also referred to as "target temperature), the interim target humidity is set to be a target value of the interior humidity of the vehicle (hereinafter also referred to as "target humidity"), and the interim target air speed is set to be a target value of the interior air speed of the vehicle (hereinafter also referred to as "target air speed").

At the subsequent step 340, the amenity controller 12 outputs the target values determined at step 330. Specifically, the amenity controller 12 outputs the target temperature to the temperature controller 13, the target humidity to the humidity controller 14, and the target air speed to the air flow controller 18.

If any one of the interim target values falls out of the controllable range, the amenity controller 12 re-calculates, at step 335, an interim target temperature, an interim target humidity and an interim target air speed.

In this case, the following re-calculation processes (P) and (Q) may be used.

(P) The case where two of the three interim target values (the interim target temperature, the interim target humidity and the interim target air speed) fall within the respective controllable ranges and the remaining one falls out of the controllable range:

In this case, the amenity controller 12 changes the one interim target value so as to be equal to the upper limit or the lower limit of the controllable range, to whichever the one interim target value is nearer. Then, the amenity controller substitutes the changed interim target value into the corresponding variable of the above relation (e.g., if the one interim target value is the interim target temperature, the variable is the temperature t) and also substitutes the representative value of the perceived temperature range defined at step 310 into the perceived temperature in the relation. Further, the amenity controller 12 sets the remaining two variables (two of the temperature t, the humidity h and the air speed v) to values within the respective controllable ranges so that the relation is satisfied. Thus, the amenity controller 12 uses the values of the remaining two variables as the respective interim target values. In this case, one of the remaining two variables may be set to the central value of the controllable range.

(Q) The case where one of the three interim target values (the interim target temperature, the interim target humidity and the interim target air speed) falls within the controllable range and the remaining two fail to fall within the respective controllable ranges:

In this case, the amenity controller 12 changes each of the two interim target values so as to be equal to the upper limit or the lower limit, to whichever the interim target value is nearer. Then, the amenity controller 12 substitutes each changed interim target value into the corresponding variable (e.g., if the interim target value is the interim target temperature, the variable is the temperature t) in the above relation which is provided again below:

(Perceived temperature)=37−(37−$t$)/(0.68−0.0014×$h$+ 1/$A$)−0.29×$t$×(1−$h$/100), where, $A=1.76+1.4\times v^{0.75}$ Also, the amenity controller 12 substitutes the representative value of the perceived temperature range defined at step 310 into the perceived temperature in the above relation. Further, the amenity controller 12 sets the remaining one variable (one of the temperature t, the humidity h and the air speed v) to a value within the controllable range so that the relation is satisfied. Thus, the amenity controller 12 uses the remaining one variable as the corresponding interim target value.

When one or two of the three interim target values fall out of the respective controllable ranges, use of processes (P) and (Q) can correct the interim target value that falls out of the controllable range as well as the interim target value that does not fall out of the controllable range. As a result of the correction, these interim target values are permitted to fall within the range in which the vehicle interior conditions can be controlled according to the user's desire (to fall within the perceived temperature range corresponding to "quite cold").

Thus, the feedback performed by any one of the temperature controller 13, the humidity controller 14 and the air flow controller 18 acts on the processing of the remaining two controllers.

Subsequent to step 335, control proceeds to step 330. At step 330, the amenity controller 12 determines, as mentioned above, the interim target temperature as a target temperature, the interim target humidity as a target humidity, and the interim target air speed as a target air speed. Then, at step 340, the amenity controller 12 outputs the target temperature to the temperature controller 13, the target humidity to the humidity controller 14, and the target air speed to the air flow controller 18. Thus, the same advantages as those of the first embodiment can be enjoyed.

Further, the amenity controller 12 is provided in the ECU (first ECU 1) which is separate from the amenity request processor 11, temperature controller 13, humidity controller 14, air conditioner controller 15 and dehumidifier controller 16. Thus, when the calculation process (i.e. the function of the amenity controller 12) is ensured to be changeable in determining a target value of a state quantity reflecting the user's desire, the change can be readily made. For example, two types of amenity controller 12 may be prepared. One is, as in the first embodiment, the amenity controller 12 that converts the use's desire into a target value of a state quantity based on a temperature-humidity index. The other is, as in the present embodiment, the amenity controller 12 that converts the user's desire into a target value of a state quantity based on a perceived temperature. In this case, the amenity controller 12 can be cut out and installed in the ECU (first ECU 1) provided separately from the amenity request processor 11, temperature controller 13, humidity controller 14, air conditioner controller 15 and dehumidifier controller 16. Thus, the change of the control, i.e. the calculation process in determining a target value of a state quantity reflecting the user's desire, can be readily realized without requiring the change of the second ECU 2.

Figure 11:
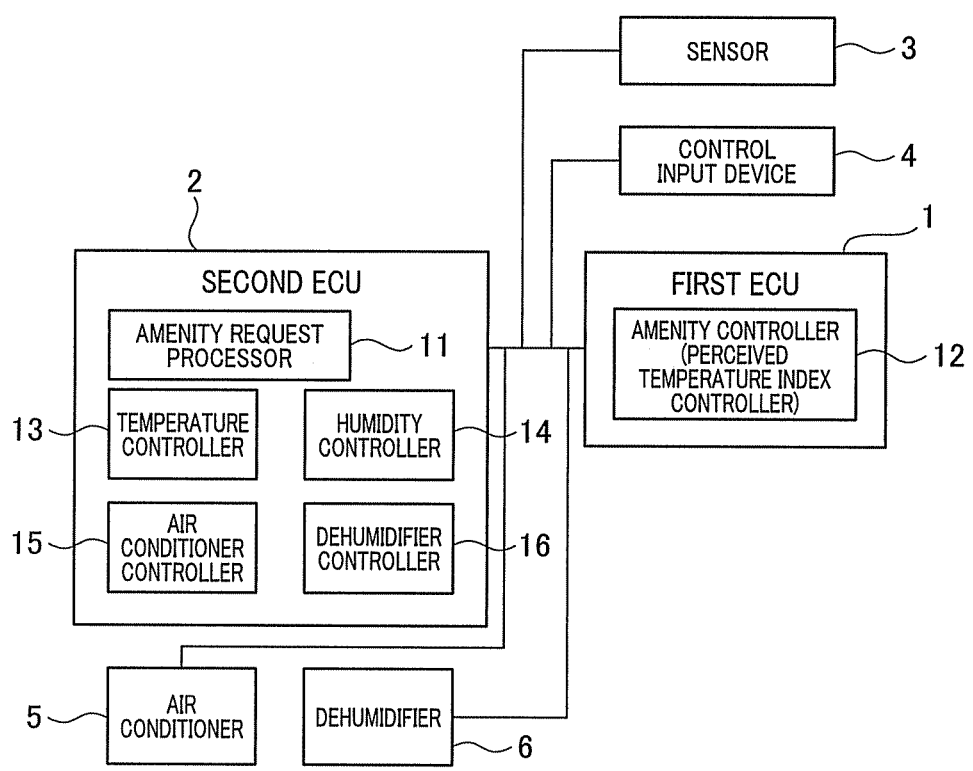
FIG. 11 is a schematic diagram illustrating another configuration of the on-vehicle control system according to the third embodiment.

Further, of the two types of amenity controller 12, one may use both the air flow controller 18 and the fan controller 19, and the other may use neither of these controllers. In this case, the former amenity controller 12 may be arranged, as shown in FIG. 8, in the ECU (first ECU 1) together with the air flow controller 18 and the fan controller 19. The latter amenity controller 12 may be solely arranged, as shown in FIG. 11, in the first ECU 1. Thus, the second ECU 2 may be commonly used for all types of vehicles. The former or the latter may be changed as appropriate by changing the first ECU 1. Such a configuration is convenient, for example, for different grade cars, such as standard cars and luxury cars, which commonly install the second ECU 2.

(Fourth Embodiment)

Figure 12:
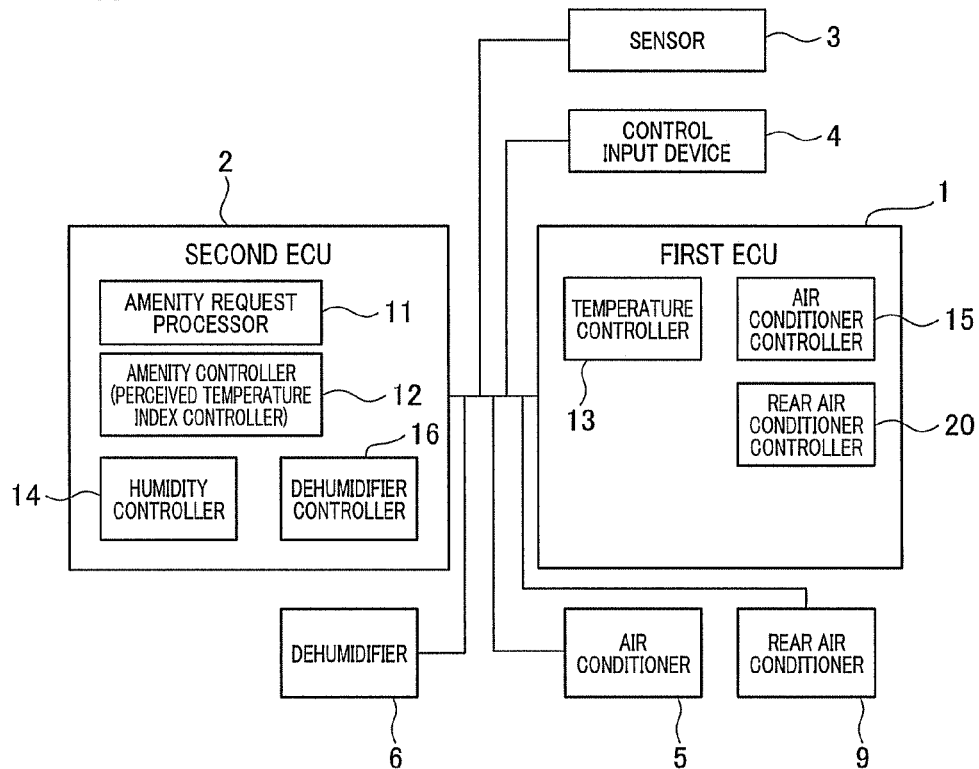
FIG. 12 is a schematic diagram illustrating a configuration of an on-vehicle control system according to a fourth embodiment of the disclosure.
Figure 13:
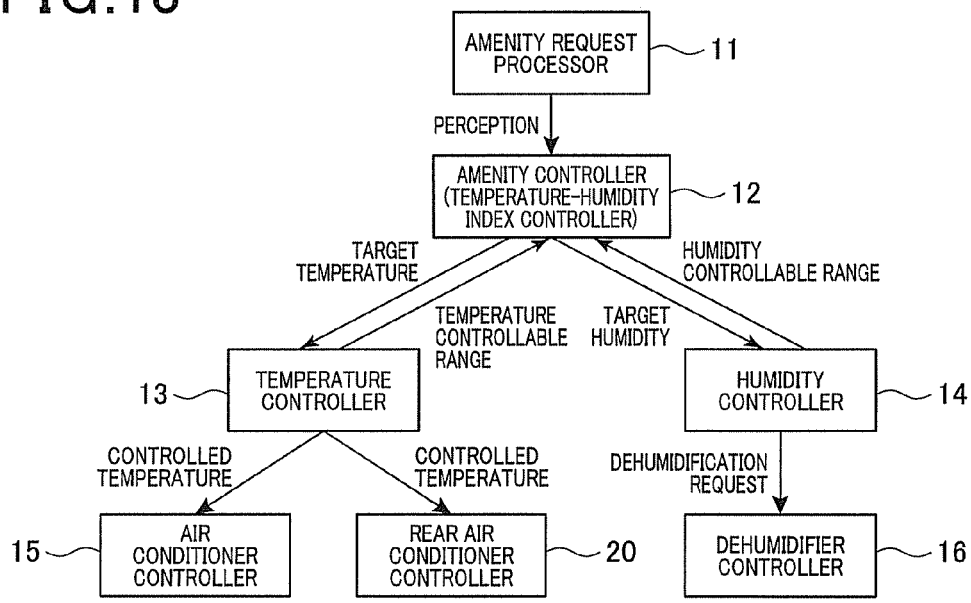
FIG. 13 is a schematic diagram illustrating a hierarchical structure of functional units in the system according to the fourth embodiment.
Figure 14:
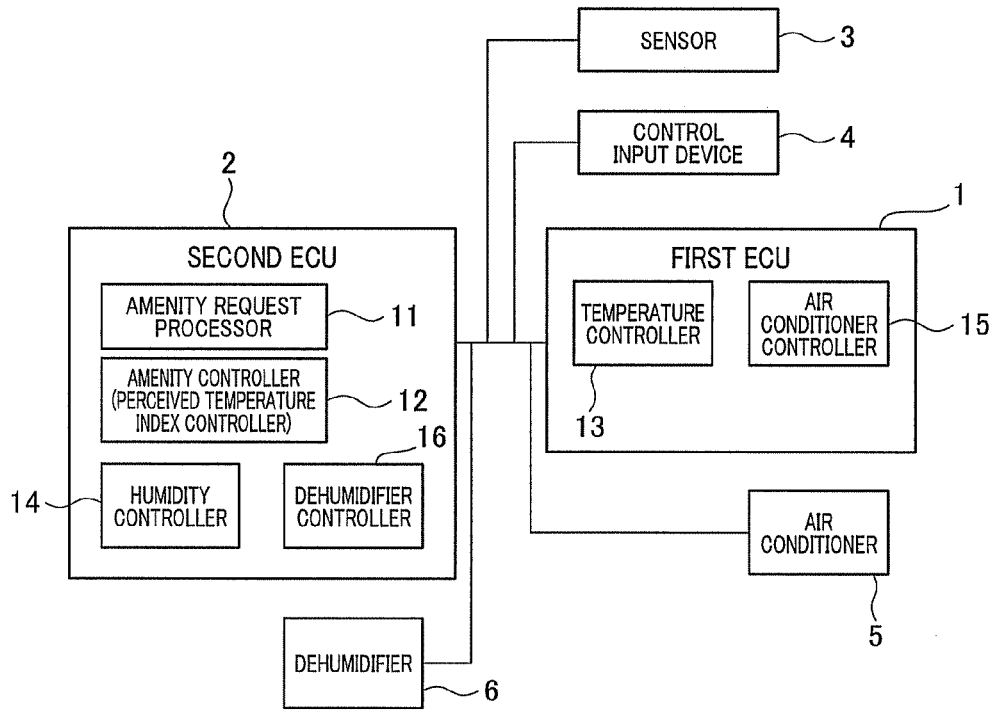
FIG. 14 is a schematic diagram illustrating another configuration of the on-vehicle control system according to the fourth embodiment.

Referring now to FIGS. 12 to 14, hereinafter is described a fourth embodiment of the disclosure. The fourth embodiment is described focusing on the differences from the first embodiment. FIG. 12 is a schematic diagram illustrating a configuration of an on-vehicle control system according to the fourth embodiment. As shown in FIG. 12, the system of the fourth embodiment includes, in addition to the configuration of the first embodiment, a rear air conditioner 9, other than the air conditioner 5, as an actuator for controlling interior temperature of the vehicle. Thus, the system of the fourth embodiment includes a rear air conditioner controller 20 for controlling the rear air conditioner 9.

The rear air conditioner controller 20 allows the rear air conditioner 9 to take cool air and warm air into the vehicle interior through an air outlet provided at a rear part of the vehicle interior. Thus, the rear air conditioner controller 20 mainly controls cooling and heating of the rear vehicle interior using, the rear air conditioner 9 as an actuator. On the other hand, the air conditioner controller 15 allows the air conditioner 5 to take cool air and warm air into the vehicle interior through an air outlet provided at a front part of the vehicle interior. Thus, the air conditioner controller 15 controls cooling and heating of the vehicle interior using the air conditioner 5 as an actuator.

In the present embodiment, arrangement of the functional units 11 to 16 in the first and second ECUs 1 and 2 is different from the first embodiment. Specifically, the first ECU 1 includes the temperature controller 13 and the air conditioner controller 15, while the second ECU 2 includes the amenity request processor 11, amenity controller 12, humidity controller 14 and dehumidifier controller 16.

Further, the control circuit of the first ECU 1 also functions as the rear air conditioner controller 20 (corresponding to an example of the first equipment control means) by executing a predetermined program in the ROM. In other words, the first ECU 1 is provided with the rear air conditioner controller 20.

FIG. 13 is a schematic diagram illustrating a hierarchical structure of the functional units 11 to 20 in the system according to the fourth embodiment. The processes performed by the amenity request processor 11, amenity controller 12, air conditioner controller 15, humidity controller 14 and dehumidifier controller 16 are the same as those of the first embodiment.

The temperature controller 13 periodically (e.g., once in a second) reads and acquires a target temperature outputted by the amenity controller 12 and stored in the RAM. The temperature controller 13 then outputs a control value for the dehumidifier controller 16 in addition to a control value for the air conditioner controller 15 in conformity with the acquired target temperature.

For example, let us discuss the case where the interior temperature sensor as the sensor 3 functions as a front-temperature sensor and a rear-temperature sensor. In this case, the temperature controller 13 calculates a controlled temperature for the air conditioner controller 15 based on a detection value derived from the front-temperature sensor and a target temperature and outputs the calculated value to the air conditioner controller 15. Further, the temperature controller 13 also calculates a controlled temperature for the rear air conditioner controller 20 based on a detection value derived from the rear-temperature sensor and the target temperature and outputs the calculated value to the rear air conditioner controller 20.

Specifically, regarding the controlled temperature for the air conditioner controller 15, the temperature controller 13 defines, first, the current front interior temperature based on a signal outputted from the front-temperature sensor, for comparison of the current front interior temperature with the read target temperature.

Then, in cooling (i.e. when the target temperature is lower than the current front interior temperature), the temperature controller 13 calculates a temperature lower than the target temperature by a predetermined offset temperature. The temperature controller 13 uses the calculated temperature as a temperature corresponding to a control value for the air conditioner controller 15 (i.e. as a controlled temperature for the air conditioner controller 15). The offset temperature is set to a larger value as the absolute value of the difference between a target temperature and a current front interior temperature becomes larger. Thus, the vehicle interior temperature more quickly reaches the target temperature.

Similarly, in heating (i.e. when the target temperature is higher than the current front interior temperature), the temperature controller 13 calculates a temperature higher than the target temperature by a predetermined offset temperature. The temperature controller 13 uses the calculated temperature as a temperature corresponding to a control value (i.e. as a controlled temperature). The offset temperature is set to a larger value as the absolute value of the difference between a target temperature and a current front interior temperature becomes larger. Thus, the vehicle interior temperature more quickly reaches the target temperature. The temperature controller 13 outputs the calculated controlled temperature as a control value to the air conditioner controller 15.

Regarding the controlled temperature for the rear air conditioner controller 20, the temperature controller 13 defines, first, the current rear interior temperature based on a signal outputted from the rear-temperature sensor, for comparison of the current rear interior temperature with the read target temperature.

Then, in cooling (i.e. when the target temperature is lower than the current rear interior temperature), the temperature controller 13 calculates a temperature lower than the target temperature by a predetermined offset temperature. The temperature controller 13 uses the calculated temperature as a temperature corresponding to a control value for the rear air conditioner controller 20 (i.e. as a controlled temperature for the rear air conditioner controller 20). The offset temperature is set to a larger value as the absolute value of the difference between a target temperature and a current rear interior temperature becomes larger. Thus, the vehicle interior temperature more quickly reaches the target temperature.

Similarly, in heating (i.e. when the target temperature is higher than the current rear interior temperature), the temperature controller 13 calculates a temperature higher than the target temperature by a predetermined offset temperature. The temperature controller 13 uses the calculated temperature as a temperature corresponding to a control value (i.e. as a controlled temperature). The offset temperature is set to a larger value as the absolute value of the difference between a target temperature and a current rear interior temperature becomes larger. Thus, the vehicle interior temperature more quickly reaches the target temperature. The temperature controller 13 outputs the calculated controlled temperature as a control value to the rear air conditioner controller 20.

The output of the controlled temperature for the air conditioner controller 15 or the rear air conditioner controller 20 is realized by writing the controlled temperature into the RAM of the control circuit. Alternative to the above configuration based on the current front and rear interior temperatures, control may be effected by outputting a controlled temperature equal to the target temperature.

The rear air conditioner controller 20 (corresponding to an example of the second equipment control means) periodically (e.g., once in a second) reads and acquires the controlled temperature (control value) outputted by (written into the RAM by) the temperature controller 13. Then, the rear air conditioner controller 20 controls the rear air conditioner 9 using various well-known methods in conformity with, or for realization of, the acquired controlled temperature.

Thus, the control based on the hierarchical structure of the disclosure is also applicable to a configuration in which both of the air conditioner 5 and the rear air conditioner 9 are used to cool/heat the front interior and the rear interior, respectively, of the vehicle.

In the present embodiment, the first ECU 1 includes the temperature controller 13, air conditioner controller 15 and the rear air conditioner controller 20. Also, the second ECU 2 includes the amenity request processor 11, amenity controller 12, humidity controller 14 and dehumidifier controller 16.

This configuration can facilitate development of the system when a plurality of models of actuators are available. Let us take as an example the case where a configuration A and a configuration B are prepared. The configuration A includes, as in the present embodiment, both of the air conditioner (front air conditioner) 5 and the rear air conditioner 9. The configuration B includes only the air conditioner 5.

In this case, the temperature controller 13 as well as the air conditioner controller 15 and the rear air conditioner controller 20 one order lower than the temperature controller 13 are cut out and installed in an ECU, or the first ECU 1, separately from the amenity request processor 11, amenity controller 12, humidity controller 14 and dehumidifier controller 16. Thus, whichever configuration is applied, the configuration is usable by changing only the first ECU 1 as required. Thus, an ECU, or the second ECU 2, including the calculation section (amenity controller 12) of a target temperature (corresponding to an example of the second state quantity) can be commonly used.

Specifically, as shown in FIG. 12, when the configuration A is used, the on-vehicle control system can be installed with the first ECU 1 that includes the temperature controller 13, the air conditioner controller 15 and the rear air conditioner controller 20. As shown in FIG. 14, when the configuration B is used, the on-vehicle control system can be installed with the first ECU 1 that includes the temperature controller 13 (having the same function as that in the first embodiment) and the air conditioner controller 15 but does not include the rear air conditioner controller 20.

In other words, the functional units associated with a variety of actuators are collectively arranged in the first ECU 1, while the otherwise functional units are collectively arranged in the second ECU 2. Thus, the second ECU 2 can be commonly used in all types of vehicles, while the first ECU 1 can be developed in conformity with the equipment (actuators) to be used in the system.

For example, a vehicle of a type may have different equipment depending on its grade or specification (whether or not the vehicle is based on a cold area specification). In such a case, the two configurations as set forth above are advantageous.

(Modifications)

Several embodiments of the disclosure have so far been described. However, the scope of the disclosure is not limited to the embodiments described above. The disclosure should encompass any modes that would realize the functions defining the disclosure. For example, the following modifications should be encompassed in the disclosure.

(1) In the embodiments described above, the functional units 11 to 20 are installed being divided into two ECUs 1 and 2. However, these functional units may be collectively installed in a single ECU. Alternatively, these functional units may be installed being divided into three or more ECUs.

(2) In the embodiments described above, hierarchical structures have been used, which are structured by user's desire outputting means (amenity request processor 11), desired-state converting means (amenity controller 12), state-equipment converting means (functional units 13, 14 and 18) and equipment control means (functional units 15, 16, 17, 19 and 20). The hierarchical structures have each been applied to the system having a purpose of conditioning air (purpose of controlling temperature, humidity, air speed and the like). However, the hierarchical structures of the on-vehicle control system of the present disclosure may be applied not only to an air conditioning system but also to any control system associated with vehicles.

Figure 15:
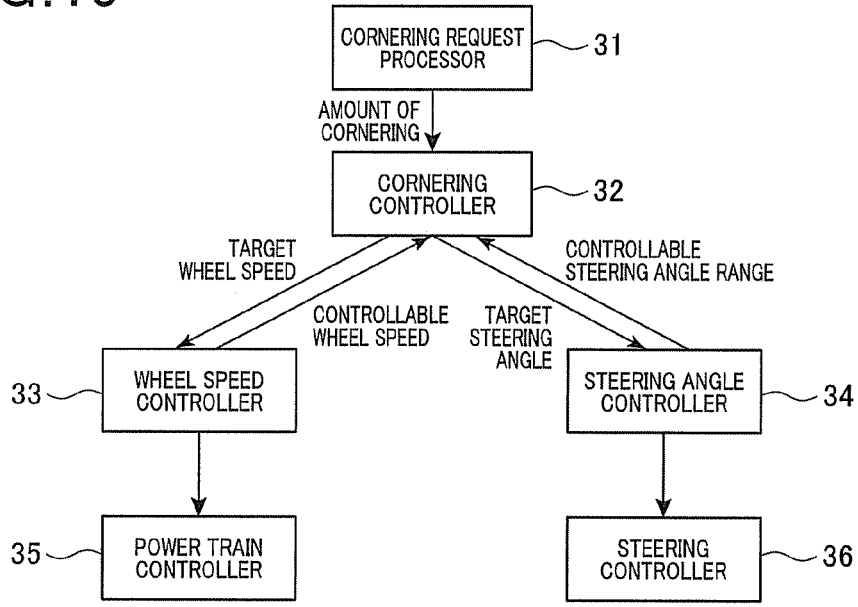
FIG. 15 is a schematic diagram illustrating a hierarchical structure of functional units according to a modification of the disclosure.

For example, the hierarchical structures may be applied to a system which realizes appropriate cornering when the vehicle turns a corner by controlling the wheel speed and the steering angle. FIG. 15 shows an example of the hierarchical structure applied to such a system, which consists of the user's desire outputting means, desire-state converting means, state-equipment converting means and equipment control means.

The example shown in FIG. 15 includes a cornering request processor 31 corresponding to the user's desire outputting means, a cornering controller 32 corresponding to the desire-state converting means, a wheel speed controller 33 corresponding to the first state-equipment converting means, a steering angle controller 34 corresponding to the second state-equipment converting means, a power train controller 35 corresponding to the first equipment control means, and a steering controller 36 corresponding to the second equipment control means.

In this example, the functional units 31 to 36 may be realized by having the control circuit of one ECU executed predetermined respective programs. In other words, these functional units 31 to 36 may be arranged in a single ECU. Alternatively, these functional units 31 to 36 may be arranged being divided into a plurality of ECUs capable of communicating with each other.

Hereinafter, the operations of the functional units 31 to 36 are explained. The cornering request processor 31 outputs a signal indicative of a user's desire (manipulated variable of the steering wheel) in response to a signal outputted from a steering manipulated variable sensor (corresponding to an example of a sensor). The steering manipulated variable sensor detects and outputs, as a signal, a manipulated variable of the steering wheel serving as a manipulation inputting means.

Then, the cornering controller 32 realizes vehicle control in conformity with the user's desire (manipulated variable of the steering wheel) indicated by the signal outputted from the cornering request processor 31. To this end, the cornering controller 32 outputs a target value of a wheel speed (first state quantity) to be generated in the power train to the wheel speed controller 33. Also, the cornering controller 32 outputs a target value of a steering angle (second state quantity) of the steering wheel to the steering angle controller 34.

Further, the wheel speed controller 33 realizes the target value of the vehicle speed outputted by the cornering controller 32. To this end, the wheel speed controller 33 calculates a control value (e.g., drive torque) for the power train (first actuator) and outputs the calculated value to the power train controller 35. Further, the power train controller 35 controls the power train according to the control value (drive torque) outputted from the wheel speed controller 33.

The steering angle controller 34 realizes the target value of the steering angle outputted by the cornering controller 32. To this end, the steering angle controller 34 calculates a control value (e.g., the steering angle) for the actuator (second actuator) that controls steering angle and outputs the calculated value to the steering controller 36. Then, the steering controller 36 controls the actuator in question according to the control value (steering angle) outputted by the steering angle controller 34.

Then, the wheel speed controller 33 defines a controllable range of wheel speed suitable for the ability of the power train and outputs the defined controllable range of wheel speed to the cornering controller 32. The steering angle controller 34 defines a controllable range of steering angle suitable for the ability of the actuator that controls steering angle and outputs the defined controllable range of steering angle to the cornering controller 32.

The cornering controller 32 defines and outputs target values of a wheel speed and a steering angle, which fall within the respective controllable ranges of wheel speed and steering angle. For example, the cornering controller 32 calculates an interim target wheel speed and an interim target steering angle based on the user's desire (manipulated variable of the steering wheel). When the calculated interim target wheel speed fails to fall within the controllable range and the calculated interim target steering angle falls within the controllable range, the cornering controller 32 corrects the interim target values. In this case, corrections are made such that vehicle control is effected in conformity with the user's manipulated variable of the steering wheel. Specifically, the interim target wheel speed is corrected so as to fall within the controllable range and the interim target steering angle is corrected so as to fall within the controllable range. Then, the corrected interim target wheel speed and the interim target steering angle are outputted as a target wheel speed and a target steering angle, respectively.

(3) In the embodiments described above, the amenity controller 12 may periodically request output of a controllable range to the state-equipment converting means 13, 14 and 18.

(4) As set forth in the second embodiment, the on-vehicle control system of the third and the fourth embodiments may each include the humidifier 7 as an actuator for controlling the humidity of the vehicle interior, as well as the humidifier controller 17 that controls the humidifier 7. In this case, the humidifier controller 17 may be included in the second ECU 2.

(5) In the embodiments described above, the control input device 4 is provided with input buttons corresponding to user's desired perceptions of coldness/hotness. The desired perceptions are expressed by "very cold", "quite cold", "cool", "comfortable", "warm", "quite hot", "hot" and "very hot". One of these desired perceptions can be inputted through the buttons. Alternative to this, the control input device 4 may be provided with input buttons corresponding to user's current perceptions of coldness/hotness. In this case as well, the current perceptions may be expressed by "very cold", "quite cold", "cool", "comfortable", "warm", "quite hot", "hot" and "very hot". One of these current perceptions may be inputted using the buttons.

In the latter case, the amenity request processor 11 may acquire the user's current perception from the control input device 4. Then, the section 11 may define a target temperature-humidity index range or a perceived temperature range based on the acquired current perception. Then, the section 11 may output the defined target temperature-humidity index range or the defined perceived temperature range, as a user's desire, to the amenity controller 12. For example, the amenity request processor 11, if it receives a signal indicating that a button of "quite cold" has been operated, may operate to heat the vehicle interior. In this case, the amenity request processor 11 may set a target temperature-humidity index range to a range larger than the current temperature-humidity index (which is calculated from the temperature and humidity of the vehicle interior), or may set a target perceived temperature range to a range larger than the current interior temperature.

(6) In the embodiments described above, the individual functions have been realized by having the control circuits of the first and second ECUs 1 and 2 executed the respective programs. Alternative to this, these functions may be realized by hardware (e.g., a circuit configuration programmable FPGA (field-programmable grid array)) having the functions.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A control system mounted in a vehicle equipped with at least one of a sensor and a user's input device and a first actuator controlled based on a signal from at least one of the sensor and user's input device, the control system comprising:

first output means for outputting information indicative of a user's desire depending on the signal from at least one of the sensor and user's input device;

second output means for outputting a target value of a first state quantity for travel of the vehicle, the target value of the first state quantity being for realizing control of in-vehicle environment in accordance with the information from the first output means:

third output means for outputting a command value for controlling the first actuator, the command value being for realizing the target value of the first state quantity outputted from the second output means; and first control means for controlling the first actuator based on the command value outputted from the third output means, wherein the third output means is configured to specify a controllable range for the first state quantity depending on a capability of the first actuator, and output the specified controllable range to the second output means, and the second output means is configured to calculate the target value of the first state quantity such that the target value falls into the controllable range outputted from the third output means.

2. The control system of claim 1, comprising a first ECU (electronic control unit) and a second ECU communicable with the first ECU, wherein the first ECU functionally includes the first output means, and the second ECU functionally includes the second and third output means and the first control means.

3. A control system mounted in a vehicle equipped with at least one of a sensor and a user's input device and a first actuator and a second actuator both controlled based on a signal from at least one of the sensor and user's input device, the control system comprising:
- first output means for outputting information indicative of a user's desire depending on the signal from at least one of the sensor and user's input device;
- second output means for outputting both a target value of a first state quantity and a target value of a second quantity for travel of the vehicle, the target values of the first and second state quantities being for realizing control of in-vehicle environment in accordance with the information from the first output means:
- third output means for outputting a command value for controlling the first actuator, the command value for controlling the first actuator being for realizing the target value of the first state quantity outputted from the second output means;
- fourth output means for outputting a command value for controlling the second actuator, the command value for controlling the second actuator being for realizing the target value of the second state quantity outputted from the second output means;
- first control means for controlling the first actuator based on the command value outputted from the third output means; and
- second control means for controlling the second actuator based on the command value outputted from the fourth output means,
- wherein the third output means is configured to specify a controllable range for the first state quantity depending on a capability of the first actuator, and output the specified controllable range to the second output means,
- the fourth output means is configured to specify a controllable range for the second state quantity depending on a capability of the second actuator, and output the specified controllable range to the second output means, and
- the second output means is configured to
- calculate both an interim target value for the first state quantity and an interim target value for the second state quantity within a range for realizing the control of the in-vehicle environment in accordance with the information from the first output means,
- determine whether or not both the interim target values for the first and second state quantities meet a condition that the interim target value for the first state quantity is outside the controllable range of the first state quantity outputted from the third output means and the interim target value for the second state quantity is within the controllable range of the second state quantity outputted from the fourth output means,
- correct the interim target value for the first state quantity falls in the controllable range of the first state quantity and the interim target value for the second state quantity is still within the controllable range of the second state quantity when it is determined that the condition is met, and
- output, as the target values for the first and second state quantities, the corrected interim target values for the first and second state quantities.

4. The control system of claim 3, comprising a first ECU (electronic control unit) and a second ECU communicable with the first ECU,
- wherein the first ECU functionally includes the second and fourth output means and the second control means, and
- the second ECU functionally includes the first and third output means and the first control means.

5. The control system of claim 4, wherein
- the first actuator is an air conditioner that controls temperature in an interior of the vehicle,
- the second actuator is a dehumidifier that dehumidifies air in the interior of the vehicle,
- the first state quantity is the temperature in the interior of the vehicle, and
- the second state quantity is humidity in the interior of the vehicle.

6. The control system of claim 3, comprising a first ECU (electronic control unit) and a second ECU communicable with the first ECU,
- wherein the first ECU functionally includes the fourth output means and the second control means, and
- the second ECU functionally includes the first, second and third output means and the first control means.

7. The control system of claim 6, wherein
- the first actuator is an air conditioner that controls temperature in an interior of the vehicle,
- the second actuator is a dehumidifier that dehumidifies air in the interior of the vehicle,
- the first state quantity is the temperature in the interior of the vehicle, and the second state quantity is humidity in the interior of the vehicle.

8. The control system of claim 3, wherein
- the first actuator is an air conditioner that controls temperature in an interior of the vehicle,
- the second actuator is a dehumidifier that dehumidifies air in the interior of the vehicle,
- the first state quantity is the temperature in the interior of the vehicle, and
- the second state quantity is humidity in the interior of the vehicle.

* * * * *